US009034942B2

(12) United States Patent
Baba et al.

(10) Patent No.: US 9,034,942 B2
(45) Date of Patent: May 19, 2015

(54) POLYMER MATERIAL, OPHTHALMIC LENS AND CONTACT LENS

(75) Inventors: Masaki Baba, Kasugai (JP); Tsuyoshi Watanabe, Kasugai (JP); Susumu Ogawa, Kasugai (JP); Daisuke Sutou, Kasugai (JP); Yuya Motoyama, Kasugai (JP); Eri Miyasaka, Kasugai (JP)

(73) Assignee: MENICON CO., LTD., Nagoya-shi (JP)

( * ) Notice: Subject to any disclaimer, the term of this patent is extended or adjusted under 35 U.S.C. 154(b) by 0 days.

(21) Appl. No.: 13/065,903

(22) Filed: Mar. 31, 2011

(65) Prior Publication Data

US 2011/0313077 A1 Dec. 22, 2011

(30) Foreign Application Priority Data

Apr. 2, 2010 (JP) ................................ 2010-086602

(51) Int. Cl.

| | |
|---|---|
| ***G02C 7/04*** | (2006.01) |
| ***C08K 13/08*** | (2006.01) |
| ***C08K 13/00*** | (2006.01) |
| ***C08K 13/02*** | (2006.01) |
| ***C08K 5/00*** | (2006.01) |
| ***G02B 1/04*** | (2006.01) |

(52) U.S. Cl.

CPC .............. *G02C 7/049* (2013.01); *C08K 5/0008* (2013.01); *G02B 1/043* (2013.01)

(58) Field of Classification Search

USPC .......................................................... 264/2.1

See application file for complete search history.

(56) References Cited

U.S. PATENT DOCUMENTS

| | | | | |
|---|---|---|---|---|
| 4,534,916 | A | 8/1985 | Wichterle | |
| 4,546,123 | A | 10/1985 | Schafer et al. | |
| 4,560,491 | A | 12/1985 | Sherman | |
| 5,260,000 | A * | 11/1993 | Nandu et al. | 264/2.1 |
| 5,330,686 | A * | 7/1994 | Smith et al. | 252/586 |
| 5,489,624 | A * | 2/1996 | Kantner et al. | 524/376 |
| 5,536,768 | A * | 7/1996 | Kantner et al. | 524/376 |
| 5,580,819 | A * | 12/1996 | Li et al. | 427/167 |
| 5,660,178 | A * | 8/1997 | Kantner et al. | 600/391 |
| 5,744,243 | A * | 4/1998 | Li et al. | 428/447 |
| 7,622,533 | B2 * | 11/2009 | Lee | 525/328.9 |
| 2004/0107506 | A1 * | 6/2004 | Detering et al. | 8/115.51 |
| 2004/0119176 | A1 * | 6/2004 | Xia et al. | 264/1.32 |
| 2006/0134169 | A1 * | 6/2006 | Linhardt et al. | 424/427 |
| 2006/0229209 | A1 * | 10/2006 | Chrisstoffels et al. | 504/361 |
| 2007/0190160 | A1 * | 8/2007 | Turos et al. | 424/490 |

FOREIGN PATENT DOCUMENTS

| | | | |
|---|---|---|---|
| EP | 0 205 674 | | 12/1986 |
| JP | 61-69023 | | 4/1986 |
| JP | 1994-32855 | * | 2/1994 |
| JP | 8-506612 | | 7/1996 |
| JP | 2000-266901 | | 9/2000 |
| JP | 2011-219512 | | 11/2011 |
| WO | WO-94/18264 | | 8/1994 |
| WO | WO-98/55155 | | 12/1998 |
| WO | WO-01/70837 | | 9/2001 |
| WO | WO-2010/036729 | | 4/2010 |

OTHER PUBLICATIONS

D. Hourdet et al: “Small-Angle Neutron Scattering Srudy of Microphase Separation in Thermoassociative Copolymers”, Macromolecules, vol. 31, No. 16, Aug. 1, 1998, pp. 5323-5335, XP55010172, ISSN: 0024-9297, DOI: 10.1021/ma9802201.

Alava C et al: “Polymer stabilisers for temperature-induced dispersion gelation: Versatility and control”, Journal of Colloid and Interface Science, Academic Press, New York, NY, US, vol. 293, No. 1 Jan. 1, 2006, pp. 93-100, XP024909111, ISSN: 0021-9797, DOI: 10.1016/J. JCIS.2005.06.027 [retrieved on Jan. 1, 2006].

* cited by examiner

*Primary Examiner* — James J Seidleck
*Assistant Examiner* — Peter A Salamon
(74) *Attorney, Agent, or Firm* — Oliff PLC

(57) ABSTRACT

Provided is a polymer material having superior water wettability and lubricity, and enabling persistence of the same by allowing the surfactant to be retained by the polymer material so as not to be gradually released. The present invention is directed to a polymer material including:
[I] a polymer having a constitutional unit derived from (A) a polymerizable compound having an acryloyloxy group and not having a silicon atom; and [II] a surfactant. The content of the surfactant [II] is preferably 0.05% by mass or greater and 1% by mass or less. The surfactant [II] is preferably a nonionic surfactant having a polyoxyethylene group.

21 Claims, No Drawings

POLYMER MATERIAL, OPHTHALMIC LENS AND CONTACT LENS

BACKGROUND OF THE INVENTION

1. Field of Invention

The present invention relates to a polymer material, and an ophthalmic lens and a contact lens constituted with the same. More particularly, the present invention relates to a polymer material which has high oxygen permeability and is superior in water wettability and lubricity of the surface as well as flexibility, and which is suited for ophthalmic lenses and contact lenses.

2. Description of the Related Art

Silicone hydrogels have been used as a material and the like of ophthalmic lenses such as contact lenses owing to high oxygen permeability. However, since silicone hydrogels have low water wettability and lubricity of the surface in general, various efforts such as surface treatments, blending of a hydrophilic polymer and the like have been made in attempts to improve these regards.

Techniques for improving lubricity and water wettability of the surface of contact lenses produced using such a silicone hydrogel were developed which include: (1) a technique of blending polyvinylpyrrolidone that is a hydrophilic polymer in a mixture of monomer components (see PCT International Publication No. 01/70837); (2) a technique of soaking a contact lens in a stock solution containing a surfactant and hydrophilic polymers to allow the surfactant and the like to attach on the surface of the contact lens (JP-A No. S61-69023); (3) a technique of allowing surfactant molecules to be covalently bonded directly on the surface of the lens of a silicone hydrogel (see U.S. Pat. No. 4,546,123); (4) a technique in producing a contact lens constituted with a silicone-containing monomer and a hydrophilic monomer as monomer components in which the monomers are homogeneously dissolved by using a surfactant and/or an organic solvent as additive(s) (U.S. Pat. No. 4,534,916); (5) a technique of permitting containments of a surfactant in a polymer by bringing a polymeric substrate into contact with a mixture of a carrier liquid and an impregnating agent containing a surfactant in a supercritical fluid such as carbon dioxide gas (JP-TA (Translation of PCT Application) No. H8-506612); and the like.

However, in the aforementioned Prior Art (1), it is difficult to homogeneously dissolve a silicone-containing monomer having hydrophobicity and a hydrophilic polymer in a monomer mixture; therefore, favorable water wettability and lubricity for a contact lens cannot be easily attained. In addition, persistence of water wettability and lubricity of a contact lens for a long period of time is impossible in the aforementioned Prior Art (2). In the aforementioned Prior Arts (3) and (4), the amount of the surfactant used is comparatively great; therefore, the surfactant aggregated on the surface of the contact lens, and the surfactant contained within the contact lens are gradually released, thereby leading to failure in persistence of water wettability and lubricity for a long period of time, and possibility of occurrence of eye irritation during use of the contact lens.

Moreover, in the aforementioned Prior Art (5), since a surfactant that substantially poorly interacts with a polymer is used, the surfactant is likely to be eluted from the polymer in a solvent such as water or buffer, leading to failure in persistence of water wettability and lubricity for a long period of time. In addition, when the surfactant is contained in a polymer material of a contact lens or the like, the polymer material per se is likely to be deformed due to the behavior in incorporation and gradual release of the surfactant, resulting in a disadvantage of impaired stability.

PRIOR ART DOCUMENTS

Patent Documents

Patent Document 1: PCT International Publication No. 01/70837

Patent Document 2: JP-A No. S61-69023

Patent Document 3: U.S. Pat. No. 4,546,123

Patent Document 4: U.S. Pat. No. 4,534,916

Patent Document 5: JP-TA (Translation of PCT Application) No. H8-506612

SUMMARY OF THE INVENTION

The present invention was made in order to overcome these disadvantages in view of the foregoings. More specifically, an object of the present invention is to provide a polymer material capable of imparting superior water wettability and lubricity, and enabling persistence of the same by allowing the surfactant to be retained by the polymer material so as not to be gradually released. Also, another object of the present invention is to provide a polymer material that is superior in shape stability.

One aspect of the invention made for solving the foregoing problems is a polymer material comprising:

[I] a polymer having a constitutional unit derived from (A) a polymerizable compound having an acryloyloxy group and not having a silicon atom; and

[II] a surfactant.

Since in the polymer material the polymer [I] has a constitutional unit derived from the component (A), the surfactant [II] can be contained within the polymer material without being gradually released. In addition the polymer material can retain therein the surfactant without elution outside owing to the interaction between the constitutional unit derived from the component (A) and the surfactant. As a result, the water wettability and lubricity of the polymer material can be improved, and the effect can be maintained.

Moreover, the polymerizable compound (A) has superior copolymerizability and compatibility with other monomer component (for example, a silicone compound of a component (B), and a compound having an amide group of a component(C), and the like described later). Accordingly, since the polymerizable composition that forms the polymer [I] contains the polymerizable compound (A), carrying out polymerization in the state of each monomer component homogeneously admixed is enabled, and the rate of polymerization can be increased. As a result, the polymer material has improved stability, thereby capable of resulting in suppression of deformation, and also capable of reducing residual percentage of the monomer component additionally.

The content of the surfactant [II] is preferably 0.05% by mass or greater and 1% by mass or less. When the content of the surfactant is not below the aforementioned lower limit, water wettability and lubricity of the surface of the polymer material are further improved. Moreover, when the content of the surfactant is not beyond the aforementioned upper limit, deformation of the polymer material per se, and the amount of elution from the polymer material can be suppressed.

As the surfactant [II] described above, a nonionic surfactant having a polyoxyethylene group is preferred. Since the surfactant having a polyoxyethylene group is effectively incorporated and retained in the polymer material by interaction with the aforementioned polymerizable compound (A), the water wettability and the lubricity of the surface of the polymer material can be improved. Additionally, when the surfactant [II] is mixed with the polymerizable composition containing the polymerizable compound (A) and curing of the mixture is permitted, an action of the nonionic surfactant having a polyoxyethylene group improves dispersibility of the polymerizable compound (A) in the polymerizable'composition, and homogeneity of the polymerizable composition, whereby a polymer material suited for ophthalmic lenses and the like can be improved.

As the nonionic surfactant having a polyoxyethylene group, at least one selected from the group consisting of polyoxyethylene hydrogenated castor oils, polyoxyethylene sorbitan fatty acid esters, polyoxyethylene polyoxypropylene copolymers and polyoxyethylene polysiloxane ether block copolymers are particularly preferred. Such a surfactant having a polyoxyethylene group and a hydrophobic moiety particularly significantly interacts with the polymer [I], and is thus incorporated into the polymer material via interaction therewith, followed by permitting tight retaining into the polymer material. Therefore, water wettability and lubricity of the surface of the polymer material can be further improved.

The glass transition temperature of a homopolymer formed from the polymerizable compound (A) is preferably no greater than 10° C. When the polymer [I] has a constitutional unit derived from the polymerizable compound (A) having such a glass transition temperature, polymer growing end becomes easily movable even in a later stage of formation of the polymer after curing proceeded to a certain degree, and thus efficient incorporation of other monomer component into the polymer chain is enabled in curing accompanying with polymerization. Therefore, the amount of the monomer remaining unpolymerized can be further reduced.

The percentage of water absorption of a homopolymer formed from the polymerizable compound (A) is preferably no greater than 20%. When the polymer [I] has a constitutional unit derived from the polymerizable compound (A) having a percentage of water absorption of the homopolymer being no greater than 20%, water content of the polymer material can be maintained at a certain level or lower, and consequently, deterioration of oxygen permeability can be inhibited.

The polymerizable compound (A) may be a compound represented by the following formula (1):

$$CH_2{=}CH{-}CO{-}(OCH_2CH_2)_n{-}OR^1 \quad (1)$$

(in the formula (1), $R^1$ represents a methyl group or an ethyl group; and n represents an integer of from 1 to 3.)

Such a compound represented by the above formula (1) can be contained within the polymer material without permitting gradual release of the surfactant, and has particularly superior in copolymerizability and compatibility with other monomer component. Therefore, when the compound represented by the above formula (1) is used as the polymerizable compound (A), unpolymerized residual percentage of other monomer component in the polymer material can be further reduced, and safety of the polymer material can be further enhanced. Thus, at least one selected from the group consisting of 2-methoxyethyl acrylate, 2-ethoxyethyl acrylate, 2-methoxyethoxyethyl acrylate and 2-ethoxyethoxyethyl acrylate is preferred as the polymerizable compound of the specific component (A) having particularly superior copolymerizability and particularly superior compatibility with other monomer component.

It is preferred that the polymer [I] further has a constitutional unit derived from (B) a silicone compound having a polymerizable group. When the polymer material is Constituted with a silicone compound having a polymerizable group as one of the monomer components, elasticity, flexibility and mechanical strength can be improved.

The silicone compound (B) is preferably (B1) a compound having an ethylenic unsaturated double bond and a polydimethylsiloxane structure via an urethane bond, and/or (B2) at least one compound selected from the group consisting of a silicone-containing alkyl(meth)acrylate, a silicone-containing styrene derivative and a silicone-containing fumaric acid diester.

Such a silicone compound of the component (B1) can impart superior oxygen permeability to the resulting polymer material owing to its siloxane moiety. In addition, such a silicone compound of the component (B1) improves elasticity of the polymer material due to having an elastic bond, i.e., a urethane bond, leading to loss of brittleness, and thus mechanical strength can be improved. On the other hand, when the silicone compound of the component (B2) is used, not only oxygen permeability but also superior flexibility can be imparted to the resulting polymer material. Moreover, when the component (B1) and the component (B2) are used in combination, still further oxygen permeability can be imparted to the silicone hydrogel, and appropriate degree of flexibility and favorable shape retention property can be both achieved.

As the silicone compound of the component (B1), compounds represented by the following formula (2) are preferred. By thus using a compound represented by the following formula (2) as the silicone compound of the component (B1), oxygen permeability, elasticity and mechanical strength of the polymer material can be further improved.

$$A^1{-}U^1{-}(S^1{-}W)_m{-}S^2{-}U^2{-}A^2 \quad (2)$$

(in the formula (2), $A^1$ and $A^2$ are each independently a group represented by the following formula (3); $U^1$ and $U^2$ are each independently a group represented by the following formula (4); $S^1$ and $S^2$ are each independently a group represented by the following formula (5); W is a group represented by the following formula (6); and m represents an integer of 0 to 10.

$$Y{-}Z{-}R^2{-} \quad (3)$$

(in the formula (3), Y is a (meth)acryloyl group, a vinyl group or an allyl group; Z is an oxygen atom or a direct bond; and $R^2$ is a direct bond, or an alkylene group having 1 to 12 carbon atoms having a linear chain, branched chain or an aromatic ring; however, Y in $A^1$ and $A^2$ may be the same or different.)

$$-X^1{-}E^1{-}X^2{-}R^3{-} \quad (4)$$

(in the formula (4), $X^1$ and $X^2$ are each independently selected from a direct bond, an oxygen atom and an alkylene glycol group; $E^1$ is a —NHCO-group (however, in this case, $X^1$ is a direct bond; $X^2$ is an oxygen atom or an alkylene glycol group; and $E^1$ forms an urethane bond with $X^2$.), a —CONH-group (however, in this case, $X^1$ is an oxygen atom or an alkylene glycol group; $X^2$ is a direct bond; and $E^1$ forms an urethane bond with $X^1$.) or a bivalent group derived from diisocyanate selected from the group consisting of saturated or unsaturated aliphatic based, alicyclic based and aromatic based ones (however, in this case, $X^1$ and $X^2$ are each independently selected from an oxygen atom and an alkylene glycol group; and $E^1$ forms two urethane bonds with $X^1$ and/or $X^2$); and $R^3$ is an alkylene group having a linear or branched chain having 1 to 6 carbon atoms.)

[formula 1]

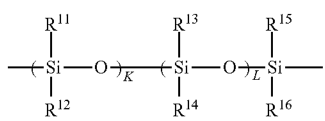

(5)

(in the formula (5), $R^{11}$, $R^{12}$, $R^{13}$, $R^{14}$, $R^{15}$ and $R^{16}$ each independently represent an alkyl group having 1 to 6 carbon atoms, a fluorine-substituted alkyl group, a phenyl group or hydrogen atom; K is an integer of 10 to 100; L is 0 or an integer of 1 to 90; and the sum of K and L is an integer of 10 to 100.)

$$—R^4—X^3\text{-}E^2\text{-}X^4—R^5— \quad (6)$$

(in the formula (6), $R^4$ and $R^5$ are each independently an alkylene group having a linear or branched chain having 1 to 6 carbon atoms; $X^3$ and $X^4$ each independently represent an oxygen atom or an alkylene glycol group; $E^2$ is a bivalent group derived from diisocyanate selected from the group consisting of saturated or unsaturated aliphatic based, alicyclic based and aromatic based ones (however, in this case, $E^2$ forms two urethane bonds with $X^3$ and/or $X^4$).)]

It is preferred that the aforementioned polymer [I] further has a constitutional unit derived from (C) a compound having an amide group. When the polymer [I] further has a structure unit derived from a compound having an amide group, water wettability of the polymer material can be further improved.

The compound having an amide group (C) is preferably N-vinylpyrrolidinone (C'). Since the N-vinylpyrrolidinone has high hydrophilicity, water wettability of the polymer material can be further improved.

It is preferred that: the aforementioned polymer [I] is formed from a polymerizable composition containing the polymerizable compound (A), the silicone compound (B) and N-vinylpyrrolidinone (C'); and in connection with the blend ratio of the components (A), (B) and (C'), the content of the polymerizable compound (A) is 10 parts by mass or greater and 45 parts by mass or less, the content of the silicone compound (B) is 10 parts by mass or greater and 70 parts by mass or less and the content of N-vinylpyrrolidinone (C') is 10 parts by mass or greater and 50 parts by mass or less, relative to 100 parts by mass of the total amount of the polymerizable compound (A), the silicone compound (B) and N-vinylpyrrolidinone (C'). When the polymerizable composition has the aforementioned blend ratios, superior lubricity and water wettability can be realized in the polymer material, and attainment of well balanced characteristics of the aforementioned each component is enabled.

It is preferred that: the polymerizable composition further contains a nonpolymerizable additive; the additive is at least one selected from the group consisting of a water soluble organic solvent, a refrigerant and a thickener; and the content of the additive is 5 parts by mass or less relative to 100 parts by mass of the total amount of the polymerizable compound (A), the silicone compound (B) and the N-vinylpyrrolidinone (C'). When the polymerizable composition contains the aforementioned additive, uniform dispersion of each monomer component is prompted, and homogeneity and transparency of the polymer material can be improved. Furthermore, when these additives are contained, the amount of unpolymerized monomer in the polymer material can be further decreased. Moreover, according to the aforementioned polymerizable composition, further functionality can be added to the polymer material by including the additives as described above.

The water soluble organic solvent is preferably at least one selected from the group consisting of an alcohol having 1 to 3 carbon atoms, acetone, methyl ethyl ketone, dimethylformamide, dimethyl sulfoxide, acetonitrile, N-methyl-2-pyrrolidone and dimethoxyethane. The water soluble organic solvent enables the compatibility between each monomer component in the polymerizable composition to be further improved, and as a result, homogeneity and copolymerizability of the polymer material can be further improved.

The aforementioned refrigerant is preferably at least one selected from the group consisting of l-menthol, d-menthol, dl-menthol, d-camphor, dl-camphor, d-borneol, dl-borneol, geraniol, eucalyptus oil, bergamot oil, fennel oil, peppermint oil, rose oil and cool mint. When such a refrigerant is contained, dispersibility of the compound having an amide group (C) in the polymerizable composition can be improved, and water wettability of the surface of the polymer material can be also improved. In addition, suitable refreshing sensation in use can be imparted to the polymer material, which is obtained from the polymerizable composition.

The aforementioned thickener is preferably at least one selected from the group consisting of sodium hyaluronate, sodium chondroitin sulfate, sodium alginate, sorbitol, dextran 70, sodium carboxymethyl cellulose, hydroxyethyl cellulose, hydroxypropylmethyl cellulose, carboxyvinyl polymer, polyvinyl alcohol, polyvinylpyrrolidone and macrogol 4000. When such a thickener is contained, dispersibility of the compound having an amide group (C) is particularly increased, whereby water wettability of the polymer material obtained from the aforementioned polymerizable composition can be particularly improved, and also suitable moist feeling in use of the polymer material can be provided.

The polymer material preferably has a water content of no less than 40%. By thus having a water content of no less than 40%, the polymer material can exhibit further superior water wettability.

Therefore, ophthalmic lenses, particularly contact lenses constituted with the polymer material with significant commercial value and reliability can be provided due to having superior oxygen permeability and water wettability as described above.

As explained in the foregoing, the polymer material of the present invention can contain a surfactant therein efficiently, and can retain the same without eluting outside since it contains a polymer having a constitutional unit derived from a polymerizable compound having an acryloyloxy group and not having a silicon atom. Therefore, the polymer material has superior lubricity, water wettability and shape stability. The polymer material having the aforementioned characteristics can be used in a variety of applications such as ophthalmic lenses such as contact lenses, catheters, tubes, stents, pipings, blood bags, probes, thin films, and the like.

DESCRIPTION OF THE PREFERRED EMBODIMENTS

Hereinafter, preferred embodiments of the polymer material of the present invention are explained in sequence.

The polymer material of the present invention contains

[I] a polymer having a certain constitutional unit, and

[II] a surfactant.

[I] Polymer

The polymer [I] has a constitutional unit derived from (A) a polymerizable compound having an acryloyloxy group and not having a silicon atom.

Suitably, the polymer may have a constitutional unit derived from (B) a silicone compound having a polymerizable group, and/or (C) a compound having an amide group.

Such a polymer [I] can be formed by curing a polymerizable composition containing a polymerizable compound having an acryloyloxy group and not having a silicon atom of the component (A). This polymerizable composition may preferably include (B) a silicone compound having a polymerizable group and/or (C) a compound having an amide group. In addition, (D) a crosslinking agent, (E) an additive, a tinting agent, an ultraviolet ray absorbing agent, an ultraviolet ray absorbing tinting agent, a polymerization initiator and the like may be included.

(Component (A): Polymerizable Compound having Acryloyloxy Group and not having Silicon Atom)

The polymerizable compound of the component (A) has an acryloyloxy group ($CH_2$═CH—CO—O—), and does not have a silicon atom. The polymerizable compound (A) allows a surfactant to be included efficiently within the polymer material due to having the aforementioned structure. In addition, interaction between the component (A) and the surfactant enables the surfactant to be retained therein without eluting outside the polymer material. As a result, water wettability and lubricity of the polymer material can be improved, and the effects can be maintained.

Furthermore, the polymerizable compound (A) has favorable compatibility with the silicone compound (B) and the compound having an amide group (C) which are preferable components described later. In addition, due to having the structure described above, the polymerizable compound (A) has superior copolymerizability with both the silicone compound (B) and the compound having an amide group (C). Therefore, when the polymerizable composition contains the polymerizable compound (A), polymerization carried out in a state in which each monomer component is homogeneously admixed is enabled, and the rate of polymerization can be elevated. As a result, residual percentage of the silicone compound (B) and the compound having an amide group (C) that remain unreacted in the polymer material obtained from the polymerizable composition can be reduced. In this manner, the polymer material has a low amount of unreacted monomer included; therefore, high safety can be achieved. As the polymerizable compound (A), one or a plurality of types of compounds may be used.

It is preferred that in the compound of the component (A), the homopolymer has a glass transition temperature of no greater than 10° C. In polymerization carried out for obtaining the polymer [I], when the compound of the component (A) is positioned at the polymer growing end during polymerization, it is desired that, this growing end portion is easily movable in the polymer during the course of formation. The reason is that if the growing end is easily movable, this polymer growing end is likely to get close to and react with the silicone compound (B) and the compound having an amide group (C), even in a later stage of polymer formation in which the curing proceeded to a certain degree. As a result, the polymer growing end can bind to the silicone compound (B) and the compound having an amide group (C) also in a later stage of the polymer formation, and thus the amount of the silicone compound (B) and the compound having an amide group (C) that remain unpolymerized in the polymer material can be reduced.

Movability of the growing end in the polymer during the course of formation when the compound of the component (A) is positioned at the polymer growing end has significant relations with how low the glass transition temperature is as the homopolymer of this compound. More specifically, as the glass transition temperature in the homopolymer is lower, the polymer growing end in the polymer during the course of formation becomes more likely to be movable. The foregoing is a reason of the preferable glass transition temperature of the homopolymer as the compound of the component (A) being no greater than 10° C. Specifically, as the compound of the component (A), the homopolymer thereof has a glass transition temperature of preferably no greater than 10° C., more preferably no greater than 0° C., and particularly preferably no greater than −20° C. On the other hand, when the glass transition temperature it too low, the polymer material containing the component (A) may result in providing unfavorable characteristics such as significantly enhanced adhesiveness of the surface, or inferior shape retention property. Specifically, as the compound of the component (A), the homopolymer thereof has a glass transition temperature of preferably no less than −150° C., more preferably no less than −120° C., and particularly preferably no less than −100° C.

The percentage of water absorption of the compound of the component (A) as a homopolymer is preferably no greater than 20%, and more preferably no greater than 10%. Oxygen permeability may be deteriorated when the polymer material contains the compound having an amide group (C) that is highly hydrophilic. Thus, when a compound having poor water absorbing property is used as the component (A), water bearing property of the polymer material can be maintained at a certain level or below, and as a consequence, lowering of oxygen permeability of the polymer material can be inhibited. It is to be noted that the percentage of water absorption as a homopolymer is a value determined by measuring mass W1 of the homopolymer after immersing in distilled water at 25° C. for at least 16 hrs, and mass W2 of the homopolymer thereafter dried in an oven preset at 105° C. for 16 hrs, respectively, and calculating according to the following formula:

$$\text{Percentage of water absorption (\%)} = (W1 - W2)/W1 \times 100$$

The polymerizable compound (A) is not particularly limited as long as it has an acryloyloxy group, and does not have a silicon atom. More preferably, the polymerizable compound (A) further has an ether bond. When the polymerizable compound (A) has an ether bond in addition to an acryloyloxy group, the surfactant can be more efficiently included within the polymer material effectively. As a result, the water wettability and the lubricity of the polymer material can be still further improved.

In particular, the polymerizable compound (A) may be the compound represented by the following formula (1).

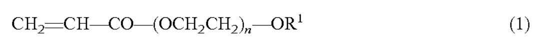

$$CH_2{=}CH{-}CO{-}(OCH_2CH_2)_n{-}OR^1 \quad (1)$$

(in the formula (1), $R^1$ represents a methyl group or an ethyl group; and n represents an integer of from 1 to 3.)

When the compound of the component (A) is the compound represented by the above formula (1), the water wettability and the lubricity of the polymer material can be still further improved. Also, the aforementioned compound has particularly superior copolymerizability and compatibility with other monomer component, and in addition, suitable movability can be provided at the growing polymer end. As a result, unpolymerized residual percentage of other monomer component in the polymer material can be further decreased.

Specific compounds of the component (A) include, for example, 2-methoxyethyl acrylate, 2-ethoxyethyl acrylate, 2-methoxyethoxyethyl acrylate, 2-ethoxyethoxyethyl acrylate, methyl acrylate, ethyl acrylate, propyl acrylate, butyl acrylate, hexyl acrylate, cyclohexyl acrylate, phenyl acrylate, benzyl acrylate and the like. Among these, 2-methoxyethyl acrylate, 2-ethoxyethyl acrylate, 2-methoxyethoxyethyl acrylate or 2-ethoxyethoxyethyl acrylate is preferred in light of ability to provide particularly superior wettability and lubricity of the polymer material.

Although the rate of the polymerizable compound (A) used is not particularly limited, it is preferably 10 parts by mass or greater and 45 parts by mass or less, and more preferably 15 parts by mass or greater and 35 parts by mass or less relative to 100 parts by mass of the total monomer component in the aforementioned polymerizable composition (i.e., the component (A), the component (B) and the component (C); the same applied in the following). When the rate of the component (A) used is not below the aforementioned lower limit, copolymerizability and compatibility of each monomer component can be improved. Whereas, when the rate of the component (A) used is not beyond the aforementioned upper limit, the contents of the silicone component and the hydrophilic component constituting the polymer material can be relatively increased Thus, superior oxygen permeability or water bearing property can be imparted to the polymer material in accordance with the intended use.

(Component (B): Silicone Compound)

The silicone compound having a polymerizable group of the component (B) is a compound having polymermable group and a siloxanyl group. The polymer [I] preferably has a constitutional unit derived from the silicone compound (B) having such a structure. When the polymer [I] has such a constitutional unit, superior oxygen permeability and flexibility can be imparted to the polymer material containing the polymer [I]. Such a silicone compound having a polymerizable group is not particularly limited as long as it has a polymerizable group and a siloxanyl group. Although the polymerizable group is not particularly limited as long as it is a group that can be polymerized, typical examples include ethylenic unsaturated groups. Specific examples of the ethylenic unsaturated group include a terminal vinyl group, an internal vinyl group, an allyl group, a (meth)acryloyl group, an α-substituted acryloyl group, a styryl group, and the like. As the silicone compound (B), one or a plurality of types of compounds may be used.

Examples of preferable silicone compound of the component (B) include compounds having a polydimethylsiloxane structure and an ethylenic unsaturated group via (B1) a urethane bond. Due to having a urethane bond and a siloxane moiety, such a silicone compound imparts flexibility, elastic resilience, oxygen permeability to the resulting polymer material, and concomitantly has an action of improving mechanical strength. In other words, such a-silicone compound has an ethylenic unsaturated group that is a polymerizable group at both ends of the molecule, and is thus copolymerized with other monomer component via this polymerizable group; therefore, it provides the resultant polymer material with not only a physical strengthening effect by crosslinking of the molecules, but also a reinforing effect by a chemical bond.

Typical examples of the compound having a polydimethylsiloxane structure and an ethylenic unsaturated group via a urethane bond of the component (B1) include polysiloxane macromonomers represented by:

$$A^1\text{-}U^1\text{—}(S^1\text{—}W)_m\text{—}S^2\text{—}U^2\text{-}A^2 \quad (2)$$

[in the formula (2), $A^1$ and $A^2$ are each independently a group represented by the following formula (3); $U^1$ and $U^2$ are each independently a group represented by the following formula (4); $S^1$ and $S^2$ are each independently a group represented by the following formula (5); W is a group represented by the following formula (6); and m represents an integer of 0 to 10.

$$Y\text{—}Z\text{—}R^2\text{—} \quad (3)$$

(in the formula (3): Y is a (meth)acryloyl group, a vinyl group or an allyl group; Z is an oxygen atom or a direct bond; and and $R^2$ is a direct bond, or an alkylene group having 1 to 12 carbon atoms having a linear chain, branched chain or an aromatic ring; however, Y in $A^1$ and $A^2$ may be the same or different.)

$$\text{—}X^1\text{-}E^1\text{-}X^2\text{—}R^3\text{—} \quad (4)$$

(in the formula (4): $X^1$ and $X^2$ each independently selected from a direct bond, an oxygen atom and an alkylene glycol group; $E^1$ is a —NHCO-group (however, in this case: $X^1$ is a direct bond; $X^2$ is an oxygen atom or an alkylene glycol group; and $E^1$ forms a urethane bond with $X^2$.), a —CONH-group (however, in this case, $X^1$ is an oxygen atom or an alkylene glycol group, $X^2$ is a direct bond, and $E^1$ forms a urethane bond with $X^1$.) or a bivalent group derived from diisocyanate selected from the group consisting of saturated or unsaturated aliphatic based, alicyclic based and aromatic based ones (however, in this case, $X^1$ and $X^2$ are each independently selected from an oxygen atom and an alkylene glycol group; $E^1$ forms two urethane bonds with $X^1$ and/or $X^2$.); and $R^3$ is an alkylene group having a linear or branched chain having 1 to 6 carbon atoms.)

[formula 2]

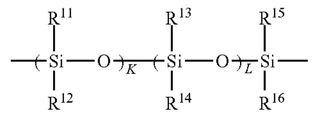

(5)

(in the formula (5), $R^{11}$, $R^{12}$, $R^{13}$, $R^{14}$, $R^{15}$ and $R^{16}$ each independently represent an alkyl group having 1 to 6 carbon atoms, a fluorine-substituted alkyl group, a phenyl group or a hydrogen atom; K is an integer of 10 to 100; L is 0 or an integer of 1 to 90; and the sum of K and L is an integer of 10 to 100.)

$$\text{—}R^4\text{—}X^3\text{-}E^2\text{-}X^4\text{—}R^5\text{—} \quad (6)$$

(in the formula (6): $R^4$ and $R^5$ are each independently an alkylene group having a linear or branched chain having 1 to 6 carbon atoms; $X^3$ and $X^4$ each independently represent an oxygen atom or an alkylene glycol group; $E^2$ is a bivalent group derived from diisocyanate selected from the group consisting of saturated or unsaturated aliphatic based, alicyclic based and aromatic based ones (however, in this case, $E^2$ forms two urethane bonds with $X^3$ and/or $X^4$))].

In the above formula (2), any Y in $A^1$ and $A^2$ is a polymerizable group, and is particularly preferably an acryloyl group in terms of ability to easily copolymerize with the compound of the component (A) and the compound having an amide group of the component (C).

In the above formula (2), any Z in $A^1$ and $A^2$ is an oxygen atom or a direct bond, and is preferably an oxygen atom.Additionally, any $R^2$ in $A^1$ and $A^2$ is a direct bond, or an alkylene group having 1 to 12 carbon atoms having a linear chain, branched chain or an aromatic ring, and is preferably alkylene group having 2 to 4 carbon atoms. $U^1$, $U^2$ and W represent a group having a urethane bond in the molecular chain.

In $U^1$ and $U^2$ in the above formula (2), $E^1$ represents a bivalent group derived from diisocyanate each selected from the group consisting of a —CONH-group, a —NHCO-group or saturated or unsaturated aliphatic based, alicyclic based and aromatic based ones, as described above. Herein, examples of the bivalent group derived from diisocyanate selected from the group consisting of saturated or unsaturated aliphatic based, alicyclic based and aromatic based ones include: bivalent groups derived from saturated aliphatic based diisocyanate such as ethylene diisocyanate, 1,3-diisocyanate propane, and hexamethylene diisocyanate; bivalent groups derived from alicyclic based diisocyanate such as 1,2-diisocyanatecyclohexane, bis(4-isocyanatecyclohexyl) methane, and isophorone diisocyanate; bivalent groups derived from aromatic based diisocyanate such as tolylene diisocyanate, and 1,5-diisocyanatenaphthalene; and bivalent groups derived from unsaturated aliphatic based diisocyanate such as 2,2'-diisocyanatediethyl fumarate. Among these examples, bivalent groups derived from hexamethylene diisocyanate, bivalent groups derived from tolylene diisocyanate and bivalent groups derived from isophorone diisocyanate are preferred in light of availability and capability of imparting strength to the resulting polymer material.

In $U^1$ and $U^2$ in the above formula (2), provided that $E^1$ is a —NHCO-group: $X^1$ is a direct bond; $X^2$ is an oxygen atom or an alkylene glycol group; and $E^1$ forms a urethane bond represented by the formula: —NHCOO—, with $X^2$. In addition, provided that $E^1$ is a —CONH-group: $X^1$ is an oxygen atom or an alkylene glycol group; $X^2$ is a direct bond; and $E^1$ forms a urethane bond represented by the formula: —OCONH—, with $X^1$. Furthermore, provided that $E^1$ is the bivalent group derived from diisocyanate described above: $X^1$ and $X^2$ are preferably each independently selected from an oxygen atom and an alkylene glycol group having 1 to 6 carbon atoms; and $E^1$ forms two urethane bonds with $X^1$ and $X^2$. $R^3$ is an alkylene group having a linear or branched chain having 1 to 6 carbon atoms.

In W in the above formula (2), $E^2$ represents a bivalent group derived from diisocyanate selected from the group consisting of saturated or unsaturated aliphatic based, alicyclic based and aromatic based ones, as described above. Herein, examples of the bivalent group derived from diisocyanate selected from the group consisting of the saturated or unsaturated aliphatic based, alicyclic based and aromatic based ones include bivalent groups similar to those defined in connection with $U^1$ and $U^2$. Among these examples, bivalent groups derived from hexamethylene diisocyanate, bivalent group derived from tolylene diisocyanate and bivalent groups derived from isophorone diisocyanate are preferred in light of availability and capability of imparting strength to the resulting polymer material. In addition, $E^2$ forms two urethane bonds with $X^3$ and $X^4$. $X^3$ and $X^4$ are preferably, each independently an oxygen atom or an alkylene glycol group having 1 to 6 carbon atoms, and $R^4$ and $R^5$ each independently represent an alkylene group having a linear or branched chain having 1 to 6 carbon atoms.

$X^1$, $X^2$, $X^3$ and $X^4$ in the above formulae (4) and (6) are preferably an alkylene glycol group having 1 to 20 carbon atoms. The alkylene glycol group having 1 to 20 carbon atoms is represented by the following formula (7).

$$—O—(C_xH_{2x}—O)_y— \quad (7)$$

(in the formula (7), x represents an integer of 1 to 4, and y represents an integer of 1 to 5.)

In the above formula (5), examples of $R^{11}$, $R^{12}$, $R^{13}$, $R^{14}$, $R^{15}$ and $R^{16}$, provided that they are a fluorine-substituted alkyl group, include groups represented by: $—(CH_2)_g—C_pF_{2p+1}$ (g=1 to 10, p=1 to 10). Specific examples of such a fluorine-substituted alkyl group include side chain type fluorine-substituted alkyl groups such as a 3,3,3-trifluoro-n-propyl group, a 2-(perfluorobutyl)ethyl group, and a 2-(perfluorooctyl)ethyl group; branched chain type fluorine-substituted alkyl groups such as a 2-(perfluoro-5-methylhexyl)ethyl group, and the like. When such a fluorine-substituted compound having an alkyl group is blended in a large amount, resistance to lipid staining of the resulting polymer material is improved.

In the above formula (5) representing $S^1$ and $S^2$; K is an integer of 10 to 100; L is 0 or an integer of 1 to 90; sum of K and L is an integer of 10 to 100, and preferably 10 to 80. When the sum of K and L is greater than 100, the molecular weight of the silicone compound increases; therefore, compatibility of the same with the compound having an amide group (C) becomes inferior, whereby phase separation occurs during polymerization to often cause clouding, and thus obtaining a homogenous and transparent polymer material may fail. Also, when the sum of K and L is less than 10, oxygen permeability of the resulting polymer material may be lowered, and the flexibility is likely to be deteriorated.

In the above formula (2), m is an integer of 0 to 10, and preferably an integer of 0 to 5. When m is greater than 10, the molecular weight of the silicone compound increases similarly to the case described above; therefore, compatibility of the same with N-vinylpyrrolidinone of the component (C') becomes inferior, whereby phase separation occurs during polymerization to often cause clouding, and thus obtaining a homogenous and transparent polymer material may fail.

Typical examples of the silicone compound of the component (B1) represented by the above formula (2) include compounds represented by the following formula (8) and the following formula (9).

[formula 3]

(8)

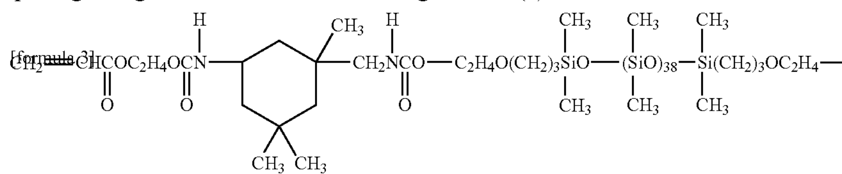

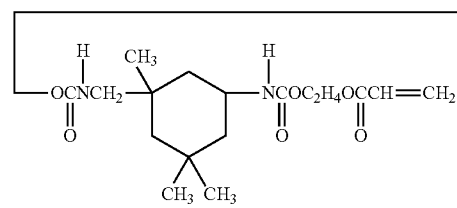

-continued

[formula 4]

(9)

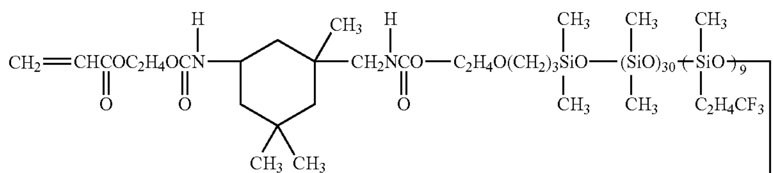

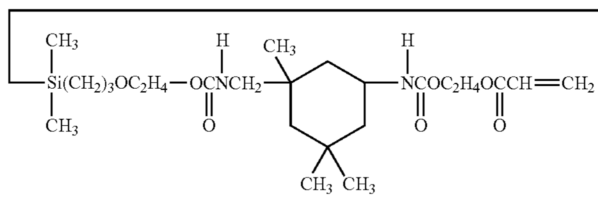

Also, as the silicone compound (B), using (B2) at least one compound selected from the group consisting of silicone-containing alkyl(meth)acrylate, a silicone-containing styrene derivative and a silicone-containing fumaric acid diester is preferred in order to improve oxygen permeability of the resulting polymer material and to impart superior flexibility.

Examples of the silicone-containing alkyl(meth)acrylate include e.g., trimethylsiloxydimethylsilylmethyl(meth)acrylate, trimethylsiloxydimethylsilylpropyl(meth)acrylate, methylbis(trimethylsiloxy)silylpropyl(meth)acrylate, tris(trimethylsiloxy)silylpropyl(meth)acrylate, mono[methylbis(trimethylsiloxy)siloxy]bis(trimethylsiloxy)silylpropyl(meth)acrylate, tris[methylbis(trimethylsiloxy)siloxy]silylpropyl(meth)acrylate, methylbis(trimethylsiloxy)silylpropylglyceryl(meth)acrylate, tris(trimethylsiloxy)silylpropylglyceryl(meth)acrylate, mono[methylbis(trimethylsiloxy)siloxy]bis(trimethylsiloxy)silylpropylglyceryl(meth)acrylate, trimethylsilylethyltetramethyldisiloxypropylglyceryl(meth)acrylate, trimethylsilylmethyl(meth)acrylate, trimethylsilylpropylglyceryl(meth)acrylate, trimethylsilylpropyl(meth)acrylate, trimethylsiloxydimethylsilylpropylglyceryl(meth)acrylate, methylbis(trimethylsiloxy)silylethyltetramethyldisiloxymethyl(meth)acrylate, tetramethyltriisopropylcyclotetrasiloxanyl propyl(meth)acrylate, tetramethyltriisopropylcyclotetrasiloxybis(trimethylsiloxy)silylpropyl(meth)acrylate, and the like. Of these, tris(trimethylsiloxy)silylpropyl methacrylate is particularly preferred in light of availability, and ability to provide particularly enhanced flexibility of the resulting polymer material.

Examples of the silicone-containing styrene derivative include compounds represented by the following formula (10), and the like.

[formula 5]

(10)

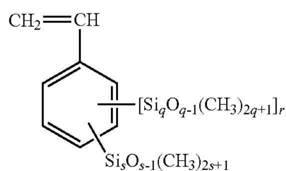

(in the formula (10), q represents an integer of 1 to 15; r represents 0 or 1; and s represents an integer of 1 to 15.)

Specific examples of the silicone-containing styrene derivative represented by the above formula (10) include, for example, tris(trimethylsiloxy)silylstyrene, bis(trimethylsiloxy)methylsilylstyrene, (trimethylsiloxy)dimethylsilylstyrene, tris(trimethylsiloxy)siloxydimethylsilylstyrene, [bis(trimethylsiloxy)methylsiloxy]dimethylsilylstyrene, (trimethylsiloxy)dimethylsilylstyrene, heptamethyltrisiloxanylstyrene, nonamethyltetrasiloxanylstyrene, pentadecamethylheptasiloxanylstyrene, heneicosamethyldecasiloxanylstyrene, heptacosamethyltridecasiloxanylstyrene, hentriacontamethylpentadecasiloxanylstyrene, trimethylsiloxypentamethyldisiloxymethylsilylstyrene, tris(pentamethyldisiloxy)silylstyrene, tris(trimethylsiloxy)siloxybis(trimethylsiloxy)silylstyrene, bis(heptamethyltrisiloxy)methylsilylstyrene, tris[methylbis(trimethylsiloxy)siloxy]silylstyrene, heptakis(trimethylsiloxy)trisilylstyrene, trimethylsiloxybis[tris(trimethylsiloxy)siloxy]silylstyrene, nonamethyltetrasiloxyundecylmethylpentasiloxymethylsilylstyrene, tris[tris(trimethylsiloxy)siloxy]silylstyrene, (tristrimethylsiloxyhexamethyl)tetrasiloxy[tris(trimethylsiloxy)si loxy]trimethylsiloxysilylstyrene, nonakis(trimethylsiloxy)tetrasilylstyrene, bis(tridecamethylhexasiloxy)methylsilylstyrene, heptamethylcyclotetrasiloxanylstyrene, heptamethylcyclotetrasiloxybis(trimethylsiloxy)silylstyrene, tripropyltetramethylcyclotetrasiloxanylstyrene, trimethylsilylstyrene, and the like.

Examples of the silicone-containing fumaric acid diester include compounds represented by the following formula (11), and the like.

[formula 6]

(11)

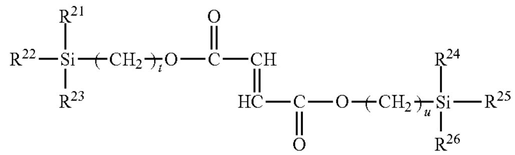

(in the formula (11), $R^{21}$, $R^{22}$, $R^{23}$, $R^{24}$, $R^{25}$ and $R^{26}$ each independently represent a methyl group or a trimethylsiloxy group, and t and u each independently represent an integer of 1 to 3.)

Specific examples of the silicone-containing fumaric acid diester represented by the above formula (11) include bis(3-(trimethylsilyl)propyl)fumarate, bis(3-(pentamethyldisiloxanyl)propyl)fumarate, bis(tris(trimethylsiloxy)silylpropyl)fumarate, and the like.

The component (B1) and the component (B2) may be used alone; however, both may be used in combination for imparting still superior oxygen permeability to the silicone hydrogel, and achieving both favorable shape retention property and superior flexibility. Although the rate of the silicone compound (B) containing the component (B1) and the component (B2) relative to 100 parts by mass of the entire monomer components is not particularly limited, it is preferably 10 parts by mass or greater and 70 parts by mass or less, and more preferably 15 parts by mass or greater and 65 parts by mass or less. When the rate of the component (B) used is not below the aforementioned lower limit, a polymer material having sufficient oxygen permeability and superior flexibility can be obtained. In addition, when the rate of the component (B) used is not beyond the aforementioned upper limit, reduction in hydrophilicity and transparency and the like of the resulting polymer material can be prevented.

The silicone compound (B) may have a structure with a hydrophilic moiety in the molecule. When the silicone compound has a structure with a hydrophilic moiety in this manner, compatibility of the silicone compound (B) with the compound having an amide group (C) is improved, and thus water wettability of the resulting polymer material can be improved. Examples of the structure with a hydrophilic moiety of the silicone compound include polyethylene glycol, polypropylene glycol, polyvinyl alcohol, polyvinylpyrrolidone, poly(meth)acrylic acid, poly(meth)acrylic acid salt, poly(2-hydroxyethyl(meth)acrylate), polytetrahydrofuran, polyoxetane, polyoxazoline, polyacrylamide, polydimethylacrylamide, polydiethylacrylamide, poly(2-methacryloyloxyethylphosphorylcholine) and these block polymer, and the like. This structure with a hydrophilic moiety may be bonded to the silicone compound either in a graft manner, or at one end or both two ends. This structure with a hydrophilic moiety has a molecular weight of preferably 100 to 1,000,000, and still more preferably 1,000 to 500,000. When the molecular weight is less than the aforementioned lower limit, imparting sufficient hydrophilicity to the degree of attaining compatibility with the compound having an amide group (C) may fail. On the other hand, when the molecular weight is beyond the aforementioned upper limit, each of hydrophilicity and hydrophobicity increase, whereby transparent polymer material is less likely to be obtained.

(Component (C): Compound having Amide Group)

The compound having an amide group of the component (C) can be copolymerized with the polymerizable compound of the component (A) and the silicone compound of the component (B). The aforementioned polymer [I] preferably has a constitutional unit derived from the compound having an amide group (C). By having the constitutional unit derived from the component (C), the polymer [I] improves hydrophilicity of the polymer material, and water wettability and lubricity of the surface can be improved. Examples of the compound having an amide group (C) include acrylamide, as well as N-substituted acrylamide such as N,N-dimethylacrylamide, N,N-diethylacrylamide, N-(2-hydroxyethyl)acrylamide, N-isopropylacrylamide and acryloylmorpholine, N-vinylpyrrolidinone, N-vinylacetamide, and the like. Of these, N-vinylpyrrolidinone is preferred due to having high hydrophilicity, and being capable of further enhancing the water wettability and the lubricity of the surface of the polymer material.

The rate of the N-vinylpyrrolidinone used relative to 100 parts by mass of the entire monomer components is not particularly limited, but is preferably 10 parts by mass or greater and 50 parts by mass or less, and more preferably 15 parts by mass or greater and 45 parts by mass or less. When the rate of N-vinylpyrrolidinone used is not below the aforementioned lower limit, water wettability of the polymer material can be improved. Whereas, when the rate of N-vinylpyrrolidinone used is not beyond the aforementioned upper limit, reduction of the oxygen permeability and transparency and the like of the polymer material can be prevented.

(Crosslinking Agent (D))

In order to regulate crosslinking density as well as flexibility of the polymer material, a crosslinking agent may be added to the polymerizable composition as a component (D). Examples of such a crosslinking agent include allyl(meth)acrylate, vinyl(meth)acrylate, 4-vinylbenzyl(meth)acrylate, 3-vinylbenzyl(meth)acrylate, (meth)acryloyloxyethyl(meth)acrylate, ethylene glycol di(meth)acrylate, diethylene glycol di(meth)acrylate, diethylene glycoldiallyl ether, triethylene glycol di(meth)acrylate, tetraethylene glycol di(meth)acrylate, propylene glycol di(meth)acrylate, dipropylene glycol di(meth)acrylate, butanediol di(meth)acrylate, trimethylolpropane tri(meth)acrylate, 2,2-bis[p-(meth)acryloyloxyphenyl]hexafluoropropane, 2,2-bis[m-(meth)acryloyloxyphenyl]hexafluoropropane, 2,2-bis[o-(meth)acryloyloxyphenyl]hexafluoropropane, 2,2-bis[p-(meth)acryloyloxyphenyl]propane, 2,2-bis[m-(meth)acryloyloxyphenyl]propane, 2,2-bis[o-(meth)acryloyloxyphenyl]propane, 1,4-bis[2-(meth)acryloyloxyhexafluoroisopropyl]benzene, 1,3-bis[2-(meth)acryloyloxyhexafluoroisopropyl]benzene, 1,2-bis[2-(meth)acryloyloxyhexafluoroisopropyl]benzene, 1,4-bis[2-(meth)acryloyloxyisopropyl]benzene, 1,3-bis[2-(meth)acryloyloxyisopropyl]benzene, 1,2-bis[2-(meth)acryloyloxyisopropyl]benzene, and the like. These crosslinking agents may be used alone or a plurality of types thereof may be used.

The rate of the crosslinking agent used in the polymerizable composition is preferably 0.05 parts by mass or greater and 1 part by mass or less, and particularly preferably 0.1 parts by mass or greater and 0.8 parts by mass or less relative to 100 parts by mass of the entire monomer components. When the rate of the crosslinking agent used is not below the aforementioned lower limit, shape stability, strength, durability and the like can be imparted to the polymer material, and regulation of flexibility and the like can be carried out certainly. On the other hand, when the rate of the crosslinking agent used is not beyond the aforementioned upper limit, inhibition of excessive hardening of the polymer material is enabled.

(Component: Additive (E))

When imparting desired characteristics to the polymer material is intended, a water soluble organic solvent, a refrigerant, a thickener and the like that are nonpolymerizable may be used as the additive of the component (E). It should be noted that the additive of the component (E) does not involve a surfactant.

The upper limit of the rate of these additives used relative to 100 parts by mass of the entire monomer components is preferably 5 parts by mass, and particularly preferably 3 parts by mass. In addition, the lower limit of these additives used relative to 100 parts by mass of the entire monomer components is preferably 0.1 parts by mass, and particularly preferably 0.3 parts by mass. With respect to these additives, when the rate of the water soluble organic solvent used is beyond the aforementioned upper limit, elution in an elution step after curing takes a long period of time due to these nonpolymerizable components increased, and sufficient elution of these nonpolymerizable components becomes difficult which may remain in the polymer material. On the other hand, when the rate of the refrigerant and the thickener used is beyond the aforementioned upper limit, the polymerizable composition and the resulting polymer material may be nonhomogenous and/or opaque. To the contrary, when the rate of the additive used is less than the aforementioned lower limit, the effect of using the additive may not be satisfactorily achieved irrespective of the type of the additive.

As the water soluble organic solvent, an alcohol having 1 to 3 carbon atoms, acetone, methyl ethyl ketone, dimethylformamide, dimethyl sulfoxide, acetonitrile, N-methyl-2-pyrrolidone, dimethoxyethane or the like may be used. When such a water soluble organic solvent is used, compatibility of monomer components such as N-vinylpyrrolidinone of the component (C') and the like is improved; therefore, uniform dispersion in the polymerizable composition can be further promoted, and as a result, the rate of unpolymerized monomer can be reduced.

The refrigerant can enhance compatibility among each monomer components, and unreacted residual component in the polymer material can be lowered. In addition, when a contact lens or the like is produced from a polymer material, for example, the refrigerant can impart exhilarating sensation to eyes, or can eliminate foreign-body sensation and itchy sensation in wearing contact lenses.

Although the refrigerant is not particularly limited, l-menthol, d-menthol, dl-menthol, d-camphor, dl-camphor, d-borneol, dl-borneol, geraniol, eucalyptus oil, bergamot oil, fennel oil, peppermint oil, rose oil, cool mint or the like may be included.

The thickener can improve compatibility of each monomer component and decrease unreacted residual components in the polymer material, and also can adjust the viscosity of the polymerizable composition. In addition, the thickener enables to provide eyes with moist feeling when the polymer material is used to produce contact lenses and the like, for example.

Although the thickener is not particularly limited, sodium hyaluronate, sodium chondroitin sulfate, sodium alginate, sorbitol, dextran 70, sodium carboxymethyl cellulose, hydroxyethyl cellulose, hydroxypropyl methyl cellulose, carboxyvinyl polymer, polyvinyl alcohol, polyvinylpyrrolidone, macrogol 4000 and the like may be included.

When the polymer material obtained by polymerizing the aforementioned polymerizable composition is used as an ophthalmic lens such as a contact lens, a polymerizable or nonpolymerizable ultraviolet ray absorbing agent, a tinting agent or an ultraviolet ray absorbing tinting agent may be further contained in the composition, whereby imparting absorptivity of ultraviolet ray, or coloring the material is enabled. These may be used either alone, or two or more thereof may be selected to use.

Specific examples of the polymerizable ultraviolet ray absorbing agent include, for example: benzophenone based polymerizable ultraviolet ray absorbing agents such as 2-hydroxy-4-(meth)acryloyloxybenzophenone, 2-hydroxy-4-(meth)acryloyloxy-5-t-butylbenzophenone, 2-hydroxy-4-(meth)acryloyloxy-2',4'-dichlorobenzophenone, and 2-hydroxy-4-(2'-hydroxy-3'-(meth)acryloyloxypropoxy) benzophenone; benzotriazole based polymerizable ultraviolet ray absorbing agents such as 2-(2'-hydroxy-5'-(meth)acryloyloxyethylphenyl)-2H-benzotriazole, 2-(2'-hydroxy-5'-(meth)acryloyloxyethylphenyl)-5-chloro-2H-benzotriazole, 2-(2'-hydroxy-5'-(meth)acryloyloxypropylphenyl)-2H-benzotriazole, 2-(2'-hydroxy-5'-(meth)acryloyloxypropyl-3'-t-butylphenyl)-5-chloro-2H-benzotriazole, and 2-(2'-hydroxy-5'-(2''-methacryloyloxyethoxy)-3'-t-butylphenyl)-5-methyl-2H-benzotriazole; salicylic acid derivative based polymerizable ultraviolet ray absorbing agents such as phenyl 2-hydroxy-4-methacryloyloxymethyl benzoate; 2-cyano-3-phenyl-3-(3'-(meth)acryloyloxyphenyl)propenyl acid methyl ester, and the like. These may be used either alone, or as a mixture of two or more thereof.

Specific examples of the polymerizable tinting agent include, for example, azo based polymerizable tinting agents such as 1-phenylazo-4-(meth)acryloyloxynaphthalene, 1-phenylazo-2-hydroxy-3-(meth)acryloyloxynaphthalene, 1-naphthylazo-2-hydroxy-3-(meth)acryloyloxynaphthalene, 1-(α-anthrylazo)-2-hydroxy-3-(meth)acryloyloxynaphthalene, 1-((4'-(phenylazo)-phenyl)azo)-2-hydroxy-3-(meth)acryloyloxynaphthalene, 1-(2',4'-xylylazo)-2-(meth)acryloyloxynaphthalene, 1-(o-tolylazo)-2-(meth)acryloyloxynaphthalene, 2-(m-(meth)acryloylamide-anilino)-4,6-bis(1'-(o-tolylazo)-2'-naphthylamino)-1,3,5-triazine, 2-(m-vinylanilino)-4-(4'-nitrophenylazo)-anilino)-6-chloro-1,3,5-triazine, 2-(1'-(o-tolylazo)-2'-naphthyloxy)-4-(m-vinylanilino)-6-chloro-1,3,5-triazine, 2-(p-vinylanilino)-4-(1'-(o-tolylazo)-2'naphthylamino)-6-chloro-1,3,5-triazine, N-(1'-(o-tolylazo)-2'-naphthyl)-3-vinylphthalic acid monoamide, N-(1'-(o-tolylazo)-2'-naphthyl)-6-vinylphthalic acid monoamide, 3-vinylphthalic acid-(4'-(p-sulfophenylazo)-1'-naphthyl) monoester, 6-vinylphthalic acid-(4'-(p-sulfophenylazo)-1'-naphthyl)monoester, 3-(meth)acryloylamide-4-phenylazo phenol, 3-(meth)acryloylamide-4-(8'-hydroxy-3',6'-disulfo-1'-naphthylazo)-phenol, 3-(meth)acryloylamide-4-(1'-phenylazo-2'-naphthylazo)-phenol, 3-(meth)acryloylamide-4-(p-tolylazo) phenol, 2-amino-4-(m-(2'-hydroxy-1'-naphthylazo)anilino)-6-isopropenyl-1,3,5-triazine, 2-amino-4-(N-methyl-p-(2'-hydroxy-1'-naphthylazo)anilino)-6-isopropenyl-1,3,5-triazine, 2-amino-4-(m-(4'-hydroxy-1'-phenylazo)anilino)-6-isopropenyl-1,3,5-triazine, 2-amino-4-(N-methyl-p-(4'-hydroxyphenylazo)anilino)-6-isopropenyl-1,3,5-triazine, 2-amino-4-(m-(3'-methyl-1'-phenyl-5'-hydroxy-4'-pyrazolylazo)anilino)-6-isopropenyl-1,3,5-triazine, 2-amino-4-(N-methyl-p-(3'-methyl-1'-phenyl-5'-hydroxy-4'-pyrazolylazo) anilino)-6-isopropenyl-1,3,5-triazine, 2-amino-4-(p-phenylazo anilino)-6-isopropenyl-1,3,5-triazine, and 4-phenylazo-7-(meth)acryloylamide-1-naphthol; anthraquinone based polymerizable tinting agents such as 1,5-bis((meth)acryloylamino)-9,10-anthraquinone, 1-(4'-vinylbenzoylamide)-9,10-anthraquinone, 4-amino-1-(4'-vinylbenzoylamide)-9,10-anthraquinone, 5-amino-1-(4'-vinylbenzoylamide)-9,10-anthraquinone, 8-amino-1-(4'-vinylbenzoylamide)-9,10-anthraquinone, 4-nitro-1-(4'-vinylbenzoylamide)-9,10-anthraquinone, 4-hydroxy-1-(4'-vinylbenzoylamide)-9,10-anthraquinone, 1-(3'-vinylbenzoylamide)-9,10-anthraquinone, 1-(2'-vinylbenzoylamide)-9,10-anthraquinone, 1-(4'-isopropenylbenzoylamide)-9,10-anthraquinone, 1-(3'-isopropenylbenzoylamide)-9,10-anthraquinone, 1-(2'-isopropenylbenzoylamide)-9,10-anthraquinone, 1,4-bis(4'-vinylbenzoylamide)-9,10-anthraquinone, 1,4-bis(4'-isopropenylbenzoylamide)-9,10-anthraquinone, 1,5'-bis(4'-vinylbenzoylamide)-9,10-anthraquinone, 1,5-bis(4'-isopropenylbenzoylamide)-9,10-anthraquinone, 1-methylamino-4-(3'-vinylbenzoylamide)-9,10-anthraquinone, 1-methylamino-4-(4'-vinylbenzoyloxy ethylamino)-9,10-anthraquinone, 1-amino-4-(3'-vinylphenylamino)-9,10-anthraquinone-2-sulfonic acid, 1-amino-4-(4'-vinylphenylamino)-9,10-anthraquinone-2-sulfonic acid, 1-amino-4-(2'-vinylbenzylamino)-9,10-anthraquinone-2- sulfonic acid, 1-amino-4-(3'-(meth)acryloylaminophenylamino)-9,10-anthraquinone-2-sulfonic acid, 1-amino-4-(3'-(meth)acryloylaminobenzylamino)-9,10-anthraquinone-2-sulfonic acid, 1-(β-ethoxycarbonyl allyl amino)-9,10-anthraquinone, 1-(β-carboxyallyl amino)-9,10-anthraquinone, 1,5-di-(β-carboxyallyl amino)-9,10-anthraquinone, 1-(β-isopropoxy carbonyl allyl amino)-5-benzoylamide-9,10-anthraquinone, 2-(3'-(meth)acryloylamide-anilino)-4-(3'-(3"-sulfo-4"-aminoanthraquinone-1"-yl)-amino-anilino)-6-chloro-1,3,5-triazine, 2-(3'-(meth)acryloylamide-anilino)-4-(3'-(3"-sulfo-4"-aminoanthraquinone-1"-yl)-amino-anilino)-6-hydrazino-1,3,5-triazine, 2,4-bis-((4"-methoxyanthraquinone-1"-yl)-amino)-6-(3'-vinylanilino)-1,3,5-triazine, and 2-(2'-vinylphenoxy)-4-(4'-(3"-sulfo-4"-aminoanthraquinone-1"-yl-amino)-anilino)-6-chloro-1,3,5-triazine; nitro based polymerizable tinting agents such as o-nitroanilinomethyl (meth)acrylate; phthalocyanine based polymerizable tinting agents such as (meth)acryloylated tetraaminocopperphthalocyanine, and (meth)acryloylated (dodecanoylatedtetraaminocopperphthalocyanine), and the like. These may be used either alone, or as a mixture of two or more thereof.

Specific examples of the polymerizable ultraviolet ray absorbing tinting agent include, for example, benzophenone based polymerizable ultraviolet ray-absorbing tinting agents such as 2,4-dihydroxy-3(p-styrenoazo)benzophenone, 2,4-dihydroxy-5-(p-styrenoazo)benzophenone, 2,4-dihydroxy-3-(p-(meth)acryloyloxymethylphenylazo)benzophenone, 2,4-dihydroxy-5-(p-(meth)acryloyloxymethylphenylazo)benzophenone, 2,4-dihydroxy-3-(p-(meth)acryloyloxyethylphenylazo)benzophenone, 2,4-dihydroxy-5-(p-(meth)acryloyloxyethylphenylazo)benzophenone, 2,4-dihydroxy-3-(p-(meth)acryloyloxypropylphenylazo)benzophenone, 2,4-dihydroxy-5-(p-(meth)acryloyloxypropylphenylazo)benzophenone, 2,4-dihydroxy-3-(o-(meth)acryloyloxymethylphenylazo)benzophenone, 2,4-dihydroxy-5-(o-(meth)acryloyloxymethylphenylazo)benzophenone, 2,4-dihydroxy-3-(o-(meth)acryloyloxyethylphenylazo)benzophenone, 2,4-dihydroxy-5-(o-(meth)acryloyloxyethylphenylazo)benzophenone, 2,4-dihydroxy-3-(o-(meth)acryloyloxypropylphenylazo)benzophenone, 2,4-dihydroxy-5-(o-(meth)acryloyloxypropylphenylazo)benzophenone, 2,4-dihydroxy-3-(p-(N,N-di(meth)acryloyloxyethylamino)phenylazo)benzophenone, 2,4-dihydroxy-5-(p-(N,N-di(meth)acryloyloxyethylamino)phenylazo)benzophenone, 2,4-dihydroxy-3-(o-(N,N-di(meth)acryloyloxyethylamino)phenylazo)benzophenone, 2,4-dihydroxy-5-(o-(N,N-di(meth)acryloylethylamino)phenylazo)benzophenone, 2,4-dihydroxy-3-(p-(N-ethyl-N-(meth)acryloyloxyethylamino)phenylazo)benzophenone, 2,4-dihydroxy-5-(p-(N-ethyl-N-(meth)acryloyloxyethylamino)phenylazo)benzophenone, 2,4-dihydroxy-3-(o-(N-ethyl-N-(meth)acryloyloxyethylamino)phenylazo)benzophenone, 2,4-dihydroxy-5-(o-(N-ethyl-N-(meth)acryloyloxyethylamino)phenylazo)benzophenone, 2, 4-dihydroxy-3-(p-(N-ethyl-N-(meth)acryloylamino)phenylazo)benzophenone, 2,4-dihydroxy-5-(p-(N-ethyl-N-(meth)acryloylamino)phenylazo)benzophenone, 2,4-dihydroxy-3-(o-(N-ethyl-N-(meth)acryloylamino)phenylazo)benzophenone, and 2,4-dihydroxy-5-(o-(N-ethyl-N-(meth)acryloylamino)phenylazo)benzophenone; benzoic acid based polymerizable ultraviolet ray-absorbing tinting agents such as phenyl 2-hydroxy-4-(p-styrenoazo)benzoate, and the like. These may be used either alone, or as a mixture of two or more thereof.

Alternatively, the aforementioned polymerizable tinting agent, ultraviolet ray absorbing agent and ultraviolet ray absorbing tinting agent may be copolymerized beforehand with a comonomer (for example, a component typified by components (A), (B) and (C)) to give a polymer, and this polymer may be added to the aforementioned polymerizable composition. Still further, for example, polyamide synthesized using amino group-containing metalphthalocyanine as a component, or a tinting agent produced by polymerizing a monomer (for example, a component typified by components (A), (B) and (C)) beforehand using an azo group-containing metalphthalocyanine as an initiator to give a polymer, and the like may be also added to the aforementioned polymerizable composition.

The content of the foregoing polymerizable tinting agent, ultraviolet ray absorbing agent and ultraviolet ray absorbing tinting agent relative to 100 parts by mass of the entire monomer components is preferably 3 parts by mass or less, and more preferably 0.01 parts by mass or greater and 2 parts by mass or less. When the total amount of these tinting agent, ultraviolet ray absorbing agent, ultraviolet ray-absorbing tinting agent exceeds 3 parts by mass, mechanical strength and the like of the ophthalmic lens material tends to be lowered. Furthermore, taking also into consideration the toxicity of the ultraviolet ray absorbing agent and the tinting agent, the product tends to be unsuitable as a composition for use in ophthalmic lenses such as contact lenses to be in direct contact with a biological tissue, or intraocular lenses to be embedded into a living body. Particularly, when a tinting agent is added in a too large amount, the color of the lens becomes so deep that transparency is deteriorated, whereby the lens becomes less likely to transmit visible light rays.

[II] Surfactant

The surfactant is contained in the polymer material. With respect to the method for allowing the surfactant to be contained, (1) a method in which the polymer [I] and the like after production is hydrated in an aqueous solution of the surfactant;

(2) a method in which the polymer [I] and the like after hydration is immersed in an aqueous solution of the surfactant and subjected to steam sterilization under pressure or the like, (3) a method in which the surfactant is contained in the polymerizable composition when the polymer [I] is produced and then polymerization is permitted, and the like may be exemplified. Since the surfactant contained within the polymer material is less likely to be gradually released due to strong interaction with the polymer [I], it is consequently retained within the polymer material. Therefore, the aforementioned surfactant can improve water wettability and lubricity of the polymer material. In addition, when the surfactant is contained according to the aforementioned method (3), each monomer component can be homogeneously dispersed in the polymerizable composition; therefore, the surfactant can exist efficiently within the polymer, and reduction of the rate of unpolymerized monomer is enabled.

The content of the surfactant in the polymer material is preferably 0.05% by mass or greater and 1% by mass or less. When the content of the surfactant is no less than 0.05% by mass, water wettability and lubricity of the surface of the polymer material are further improved. Also, when the content of the surfactant is no greater than 1% by mass, deformation of the polymer material per se, and the amount of elution of the surfactant from the polymer material can be suppressed.

As the surfactant, a known one including, for example, ionic surfactants such as cationic surfactants, anionic surfactants, and amphoteric surfactants, as well as nonionic surfactants, etc., may be used, and the surfactant is not particularly limited. Among the aforementioned surfactants, surfactants having a polyoxyethylene group are preferred in light of superior compatibility with each monomer component.

Examples, of the surfactant having a polyoxyethylene group include polyoxyethylene hydrogenated castor oils, polyoxyethylene castor oil, polyoxyethylene glycerin fatty acid esters, polyoxyethylene alkyl ethers such as polyoxyethylene lauryl ether, polyoxyethylene polyoxypropylene copolymers, polyoxyethylene polysiloxane ether block copolymers, polyoxyethylene polyoxypropyleneethylenediamine, polyoxyethylene polyoxypropylenealkyl ether, polyoxyethylene sorbitan fatty acid esters (polysorbate) such as polyoxyethylene sorbitan monooleate (for example, polysorbate 80), polyoxyethylene sorbit fatty acid esters, polyoxyethylene alkylphenyl ether, polyoxyethylene alkylphenyl ether formaldehyde condensates such as tyloxapol, polyoxyethylene sterol, polyoxyethylene hydrogenated sterol, polyoxyethylene fatty acid esters such as monostearic acid polyethylene glycol, polyoxyethylene lanolin alcohol, polyoxyethylene alkylamine, polyoxyethylene alkylamide, polyoxyethylene alkyl ether phosphate, and the like.

Among the aforementioned surfactants having a polyoxyethylene group, surfactants being nonionic and having a polyoxyethylene group are preferred in light of compatibility with each monomer component, and improvement of water wettability due to being more likely to be retained into the polymer material. Of these, polyoxyethylene hydrogenated castor oils, polyoxyethylene sorbitan fatty acid esters, polyoxyethylene alkyl ethers, polyoxyethylene polysiloxane ethers and polyoxyethylene polyoxypropylene copolymers are particularly preferred.

[Polymer Material]

The polymer material of the present invention can be obtained by, for example, heating and/or irradiating a light (ultraviolet ray and/or visible light) onto the polymerizable composition containing the aforementioned each component and the surfactant [II], to permit copolymerization and curing of each monomer component in the polymerizable composition. Alternatively, the polymer material can be also obtained by copolymerization permitted with irradiation of electron beams, in place of irradiation of a light. The polymer material can be also obtained by adding the surfactant [II] to a polymer obtained by polymerizing a polymerizable composition containing or not containing the surfactant [II].

The water content of the polymer material is preferably no less than 40%, and more preferably no less than 50%. When the water content of the polymer material is no less than 40%, water wettability of the surface of the polymer material can be improved. It is to be noted that the water content of the polymer material is a value determined by: measuring a mass W3 of the polymer material immersed in distilled water until reaching equilibrium, followed by keeping at 20° C. for at least 1 hour, and then measuring a mass W4 of the polymer material after drying in a dryer preset at 105° C. for 16 hrs, respectively; and thereafter calculating according to the following formula:

$$\text{water content (\%)}=(W3-W4)/W3\times 100$$

The polymer material can retain therein the aforementioned additives such as a refrigerant, a thickener and the like. When the polymer material is used for an ophthalmic lens, these additives can be confined within the ophthalmic lens even after subjecting to each step of hydration, elution and sterilization during the production procedure thereof. Therefore, the additives thus retained therein enable the polymer material to have various characteristics and functionalities. More specifically, the refrigerant can impart a functionality of providing persons who wear the ophthalmic lens with a fresh feeling, whereas the thickener can impart a functionality of providing eyes of persons who wear the ophthalmic lens with a moist feeling.

Moreover, the polymer material has favorable flexibility. The lower limit of the tensile modulus of elasticity that is a marker of hardness and/or flexibility of the polymer material is preferably 0.1 MPa, and more preferably 0.15 MPa. On the other hand, the upper limit of the tensile modulus of elasticity is preferably 0.8 MPa, and more preferably 0.7 MPa. When the tensile modulus of elasticity of the polymer material is below the aforementioned lower limit, restorability of the polymer material may be lost, and shape retention property on hands/fingers may be deteriorated when used for an ophthalmic lens, whereby the handlability may be inferior. To the contrary, when the tensile modulus of elasticity of the polymer material is beyond the aforementioned upper limit, the polymer material becomes so hard that wearing sensation of the ophthalmic lens may be deteriorated.

In producing the polymer material, a block polymerization method or a solution polymerization method is used. In the block polymerization method, the viscosity of the system drastically increases as polymerization proceeds, leading to failure in diffusion of the monomer component in the system with high viscosity, and thus monomers failed to participate in the polymerization reaction are likely to remain unpolymerized. Also, in the solution polymerization method, since the solvent does not participate in the reaction, it often remains in the polymer. In producing contact lenses and the like that are medical instruments, for the purpose of reducing the amount of these remaining substances as low as possible, the polymer material obtained by curing is subjected to a treatment of immersing in water or an organic solvent or a mixed solution of these, which process is preferably repeated, to permit elution of the remaining substances thereby eliminating from the polymer material. As a solvent for use in such a treatment, an aqueous solution prepared by dissolving an inorganic compound such as a physiological saline solution, or a mixed solution of the same with an organic solvent may be used.

In contrast to general polymer materials obtained by the polymerization method as described above, the amount of monomer remained unpolymerized is reduced in the polymer material of the present invention. Therefore, the polymer material has high safety for use in a variety of applications. In particular, the polymer material is particularly suited in cases when used as an ophthalmic lens such as a contact lens, and the like, since it is used being in contact with or in proximity to an eye. Moreover, since the amount of the residual monomer is low in the polymer material, the extraction step for eliminating the residual monomer from the polymer material can be unnecessary or simplified in, for example, the process of producing ophthalmic lenses. As a result, the process of production can be simplified, and the production cost can be reduced.

When the polymer material of the present invention is used as a material for ophthalmic lenses such as contact lenses, the polymerizable composition may be cured by a molding method. When the polymerizable composition is heated to be polymerized by a molding method, the aforementioned polymerizable composition and a radical polymerization initiator are blended in a mold corresponding to a desired shape of the material for ophthalmic lenses, and this mold is gradually heated to allow for polymerization, whereby an ophthalmic lens material can be produced by subjecting thus obtained polymer material to a mechanical processing such as a cutting processing or a grinding processing as needed. This cutting may be carried out either on the entire surface of one face or both two faces of the polymer material, or on a part of one face or both two faces of the polymer material.

As the thermal polymerization initiator for use in polymerization by heating, for example, 2,2'-azobisisobutyronitrile, 2,2'-azobis(2,4-dimethylvaleronitrile), benzoyl peroxide, t-butyl hydroperoxide, cumene hydroperoxide, lauroyl peroxide, t-butylperoxyhexanoate, 3,5,5-trimethylhexanoyl peroxide, and the like may be used. These thermal polymerization initiators may be used either alone, or as a mixture of two or more thereof. The amount of the thermal polymerization initiator used is preferably 0.001 parts by mass or greater and 2 parts by mass or less, and more preferably 0.01 parts by mass or greater and 1 parts by mass or less relative to 100 parts by mass of the entire monomer components of the polymerizable composition.

The heating temperature when the polymerizable composition in the mold is heated is preferably 50° C. or greater and 150° C. or less, and more preferably 60° C. or greater and 140° C. or less. Also, heating time when the polymerizable composition in the mold is heated is preferably 10 min or longer and 120 min or shorter, and more preferably 20 min or longer and 60 min or shorter. When the heating temperature in the mold is no less than 50° C., polymerization time can be shortened, and when the heating time is no shorter than 10 min, decrease of the residual monomer component can be intended. On the other hand, when the heating temperature in the mold is no greater than 150° C., or when the heating time is not longer than 120 min, volatilization of each monomer component can be suppressed, and deformation of the mold can be prevented.

When the polymerizable composition is irradiated with ultraviolet ray and/or visible light (hereinafter, merely referred to as "light") to be polymerized by a molding method, the aforementioned polymerizable composition and a photopolymerization initiator are blended in a mold corresponding to a desired shape of the material for ophthalmic lenses, and thereafter this mold is irradiated with light to allow for polymerization, whereby an ophthalmic lens material can be produced by subjecting thus obtained molded product to a mechanical processing such as a cutting processing or a grinding processing as needed. Also in such polymerization by irradiating with light, the cutting may be carried out either on the entire surface of one face or both two faces of the polymer material, or on a part of one face or both two faces of the polymer material, similarly to the case of polymerization by heating.

The material entity of the mold used in polymerization by irradiating with light is not particularly limited as long as it is a material entity that can transmit light necessary for polymerization and curing, but generally used resins such as polypropylene, polystyrene, nylon and polyester are preferred, or glass may be also employed. By subjecting the material to forming and processing, a mold having a desired shape may be provided.

After blending the aforementioned polymerizable composition containing each monomer component in such a mold, the light is irradiated to carry out the polymerization. The wavelength region of the irradiated light may be selected depending on the functions of the ophthalmic lens material. However, it is necessary to select the type of the photopolymerization initiator used depending on the wavelength region of the irradiated light. The illuminance of the light is preferably 0.1 mW/cm$^2$ or greater and 100 mW/cm$^2$ or less. Light having different illuminance may be irradiated in a stepwise manner. Also, irradiation time of the light is preferably at least 1 min. When such a light illuminance and irradiate time are employed, the polymerizable composition can be sufficiently cured while preventing the mold material from deterioration. Moreover, the polymerizable composition may be heated concomitantly with irradiation with the light, whereby the polymerize reaction is accelerated and thus the copolymer can be readily formed.

Examples of the photopolymerization initiator used in polymerization by irradiating with light include e.g.,: phosphineoxide based photopolymerization initiators such as 2,4,6-trimethylbenzoyl-diphenyl phosphineoxide (TPO), and bis(2,4,6-trimethylbenzoyl)-phenylphosphineoxide; benzoin based photopolymerization initiators such as methylorthobenzoyl benzoate, methylbenzoyl formate, benzoinmethyl ether, benzoinethyl ether, benzoinisopropyl ether, benzoinisobutyl ether, and benzoin-n-butyl ether; phenone based photopolymerization initiators such as 2-hydroxy-2-methyl-1-phenylpropane-1-one (HMPPO), p-isopropyl-α-hydroxyisobutyl phenone, p-t-butyltrichloroacetophenone, 2,2-dimethoxy-2-phenylacetophenone, α,α-dichloro-4-phenoxyacetophenone, and N,N-tetraethyl-4,4-diaminobenzophenone; 1-hydroxycyclohexyl phenyl ketone; 1-phenyl-1,2-propane dione-2-(o-ethoxycarbonyl)oxime; thioxanthone based photopolymerization initiators such as 2-chlorothioxanthone, and 2-methylthioxanthone; dibenzosubarone; 2-ethylanthraquinone; benzophenone acrylate; benzophenone; benzyl, and the like. These photopolymerization initiators may be used wither alone, or as a mixture of two or more thereof. In addition, a photosensitizer may be also used together with the photopolymerization initiator. The rate of these photopolymerization initiator and photosensitizer used is preferably 0.001 parts by mass or greater and 2 parts by mass or less, more preferably 0.01 parts by mass or greater and 1 parts by mass or less relative to 100 parts by mass of the entire monomer components of the polymerizable composition.

The amount of the residual monomer in the polymer material according to the aforementioned polymerization conditions is preferably 1% by mass or less, more preferably 0.5% by mass or less, and still more preferably 0.2% by mass or less for the compound having an amide group (C) in terms of % by mass with respect to the polymer material. Also, among the silicone compounds (B), for the component (B2) having a comparatively low molecular weight and being concerned about remaining and elution, the amount of the residual monomer is preferably 1% by mass or less, more preferably 0.1% by mass or less, and still more preferably 0.02% by mass or less. When the amount of the residual monomer derived from the compound having an amide group (C) is 1% by mass or less, safety in a variety of applications, particularly applications for ophthalmic lenses of the polymer material can be improved, and the step of elution treatment and the like of the residual monomer in the polymer material can be omitted or simplified in the production process. Even more, the silicone compound of the component (B2) is insoluble in water, and thus elution and elimination from the polymer material by means of a water-based treatment liquid such as water or physiological saline solution may be difficult unlike the compound having an amide group (C). When the amount of the residual monomer derived from the silicone compound of the component (B2) having such characteristics is 1% by mass or less, ensuring safety of the polymer material, as well as omission or simplification in the production process of the polymer material are enabled as described above, and further deterioration of physical properties and shape stability of the polymer material can be inhibited.

In order to improve characteristics of the surface of the polymer material such as ophthalmic lens materials, a low-temperature plasma treatment, atmospheric pressure plasma, corona discharge or the like may be carried out. When a low-temperature plasma treatment is carried out, ophthalmic lenses having more superior water wettability and/or stain resistance can be obtained. The low-temperature plasma treatment may be carried out in a rarefied gas atmosphere such as fluorine-substituted alkane or alkane having 1 to 6 carbon atoms, nitrogen, oxygen, carbon dioxide, argon, hydrogen, air, water, silane or a mixture of these. In particular, the low-temperature plasma treatment is preferably carried out in a rarefied gas atmosphere such as oxygen alone, carbon dioxide alone, or a mixture of oxygen with water, tetrafluoromethane, organic silane, methane, nitrogen or the like, for the reasons that a physical surface modification effect by ion etching, and a chemical surface modification effect by radical implantation are both expected. The low-temperature plasma treatment may be carried out either under a reduced pressure, or under an atmospheric pressure. In the low-temperature plasma treatment, the surface modification effect can be controlled by appropriately adjusting the output, treatment time, and gas concentration at high frequency RF (for example, 13.56 MHz), low frequency AF (for example, 15.0 to 40.0 KHz), or micro wave (for example, 2.45 GHz).

As described in the foregoing, the polymer material is suited for use in ophthalmic lenses, i.e., contact lenses as well as intraocular lenses, artificial cornea, corneal onlay, corneal inlay and the like due to having high safety.

EXAMPLES

Hereinafter, the present invention is more specifically explained by way of Examples, but the present invention is not limited to the following Examples.

[Components Used]

Meanings of abbreviations used in the following Examples are shown below. It is to be noted that components that are similar to but different from the component (A) are defined as "component other than (A)", and the component (A) and component other than (A) are collectively defined as "monomer A component".

Component (A)

2-ETA: 2-ethoxyethyl acrylate

2-MTA: 2-methoxyethyl acrylate

BuA: n-butyl acrylate

BuMA: n-butyl methacrylate

Component Other Than (A)

2-HEMA: 2-hydroxyethyl methacrylate

DMAA: N,N-dimethylacrylamide

EA: ethyl acrylate

EEA: ethoxyethoxyethyl acrylate

EMA: ethyl methacrylate

MMP: 1-methyl-3-methylene-2-pyrrolidinone

Component (B)

Macromonomer (8): compound represented by the above formula (8)

TRIS: tris(trimethylsiloxy)silylpropyl methacrylate Component (C)

N-VP: N-vinyl-2-pyrrolidinone

Crosslinking Agent(D)

EDMA: ethylene glycol dimethacrylate

AMA: allyl methacrylate

Ultraviolet Ray Absorbing Agent

HMEPBT: 2-(2'-hydroxy-5'-methacryloyloxyethylphenyl)-2H-benzotriazole

Tinting Agent

PCPMA: phthalocyanine-containing polymethacrylic acid ester Polymerization initiator TPO: 2,4,6-trimethylbenzoyl-diphenyl phosphineoxide HMPPO: 2-hydroxy-2-methyl-1-phenylpropane-1-one

Synthesis Example

Synthesis of Macromonomer (8)

Into a 1 L three neck flask equipped with a Dimroth condenser, a mechanical stirrer and a thermometer to the side tube, and previously substituted with nitrogen were charged 75.48 g (0.34 mol) of isophorone diisocyanate (IPDI) and 0.12 g of iron acetyl acetonate (FeAA). Subsequently, 529.90 g of polydimethylsiloxane with hydroxyl groups at both terminals (manufactured by Shin-Etsu Chemical Co., Ltd. "KF-6002"; degree of polymerization: 40; hydroxyl group equivalent: 1560 g/mol) was added thereto, and the mixture was stirred for about 4 hrs in an oil bath heated at 80° C.

Next, 39.47 g (0.34 mol) of 2-hydroxyethyl acrylate (HEA), and 0.20 g of p-methoxyphenol (MEHQ) as a polymerization inhibitor were added into the three neck flask, and further stirred in an oil bath at 80° C. About 3 hrs later, the reaction mixture was sampled, and analyzed using $^1$H-NMR and FT-IR to verify that a prescribed compound was obtained. Additionally, the crude product was extracted and rinsed using n-hexane and acetonitrile, and the n-hexane layer was collected and the organic solvent and the low molecular weight compound were distilled off under a reduced pressure. Accordingly, 522.33 g of a purified compound of the macromonomer (8) was obtained (yield: 81%).

Measurements of the macromonomer (8) obtained in Synthesis Example are as in the following:

(1) $^1$H-NMR (δ value, solvent: chloroform-d) 0.06 ppm (Si—$CH_3$, m), 0.52 ppm (Si—$CH_2$, 2H, m), 2.91 ppm (NH—$CH_2$, 2H, d), 3.02 ppm ($CH_2$—N═C═O, 2H, s), 3.42 ppm (—O—$CH_2$, 2H, t), 3.61 ppm (—O—$CH_2$, 2H, m), 4.18-4.34 ppm (—(O)CO—$CH_2$—, 6H, m), 4.54 ppm (NH, 1H, s), 4.85 ppm (NH, 1H, s), 5.84 ppm (CH═, 1H, dd), 6.14 ppm (CH═, 1H, dd), 6.43 ppm (CH═, 1H, dd); and (2) Infrared rays absorption spectrum (FT-IR) 1262 $cm^{-1}$ and 802 $cm^{-1}$ (Si—$CH_3$), 1094 $cm^{-1}$ and 1023 $cm^{-1}$ (Si—O—Si), 1632 $cm^{-1}$ (C═C), around 1728 $cm^{-1}$ (C═O, ester and urethane).

Example 1

A polymerizable composition was prepared that contains as shown in Table 1: 30 parts by mass of 2-MTA as the component (A), 70 parts by mass of 2-HEMA as the component other than (A) that were included as the monomer A component; 0.4 parts by mass of EDMA as the crosslinking agent of the component (D); and 0.5 parts by mass of HMPPO as the polymerization initiator. This polymerizable composition was introduced into a mold having a contact lens shape (made of polypropylene; corresponding to a contact lens having a diameter of 14.2 mm and a thickness of 0.08 mm), and then this mold was irradiated with UV light for 20 min using a high-pressure mercury lamp (2 kW) to execute photopolymerization. After completing polymerization, the product was removed from the mold to obtain a polymer having a contact lens shape. After the polymer was swollen until reaching to equilibrium by immersing in distilled water, the polymer material was rinsed in distilled water. The polymer material was immersed with phosphate buffer containing 0.05% by mass of polyoxyethylene (60) hydrogenated castor oil (hereinafter, referred to as HCO-60) that is a surfactant, and autoclaving (121° C., 20 min) was carried out in the solution.

Example 2

A contact lens was obtained in a similar manner to Example 1 described above except that 20 parts by mass of 2-MTA as the component (A), 50 parts by mass of DMAA as the component other than (A), and 30 parts by mass of the macromonomer (8) as the silicone compound of the component (B) were used.

Comparative Example 1

A contact lens was obtained in a similar manner to Example 1 described above except that 100 parts by mass of 2-HEMA of the component other than (A) was used as the monomer A component.

Comparative Example 2

A contact lens was obtained in a similar manner to Example 1 described above except that 50 parts by mass of DMAA of the component other than (A) as the monomer A component, and 50 parts by mass of the macromonomer (8) as the silicone compound of the component (B) were used.

Comparative Example 3

A contact lens was obtained in a similar manner to Example 1 described above except that sterilization (autoclaving) was carried out in a phosphate buffer not containing a surfactant for the sterilization.

Comparative Example 4

A contact lens was obtained in a similar manner to Example 2 described above except that autoclaving was carried out in a phosphate buffer not containing a surfactant for the sterilization.

Comparative Example 5

A contact lens was obtained in a similar manner to Comparative Example 1 described above except that sterilization (autoclaving) was carried out in a phosphate buffer not containing a surfactant for the sterilization.

Comparative Example 6

A contact lens was obtained in a similar manner to Comparative Example 2 described above except that sterilization (autoclaving) was carried out in a phosphate buffer not containing a surfactant for the sterilization.

Evaluation of the contact lenses of Examples 1 to 2 and Comparative Examples 1 to 6 on lubricity and water wettability was made. Thus obtained results are shown in Table 1.

[Evaluation of Lubricity]

The contact lens was folded half, sandwiched, and rubbed the lens by two fingers. Lubricity (adhesive feel between lens surfaces, adhesive feel between the lens and the finger) in this procedure was evaluated. Determination was made in accordance with the evaluation criteria in the following:

A: being suitable as a contact lens, with slidability of surfaces of the lens over each other being favorable;

B: slight frictional feel being accompanied by rubbing of the surfaces of the lens;

C: adhesiveness between the lens and the finger not being observed, but slidability of surfaces of the lens over each other being inferior, often accompanied by failure in sliding; and D: the lens surface being adherent, with adhesive feel between the lens and the finger.

[Evaluation of Water Wettability]

After the sterilization, the lens was removed using tweezers and briefly shaken twice to remove the moisture attached to the lens. Thereafter, water wettability of the lens surface was visually observed to make determination in accordance with the evaluation criteria in the following:

A: the entirety of the lens being evenly wet favorably;

B: the entirety of the lens being evenly wet favorably, but water partially repelled after standing for a certain time period;

C: somewhat inferior in water wettability, and water repellency found at peripheral part of the lens; and D: significant water repellency found.

TABLE 1

| | | | Example 1 | Example 2 | Comparative Example 1 | Comparative Example 2 | Comparative Example 3 | Comparative Example 4 | Comparative Example 5 | Comparative Example 6 |
|---|---|---|---|---|---|---|---|---|---|---|
| Monomer A component | Component (A) | 2-MTA | 30 | 20 | — | — | 30 | 20 | — | — |
| | Component other than (A) | 2-HEMA | 70 | — | 100 | — | 70 | — | 100 | — |
| | | DMAA | — | 50 | — | 50 | — | 50 | — | 50 |
| Component (B) | | macro-monomer (8) | — | 30 | — | 50 | — | 30 | — | 50 |
| Component (D) | | EDMA | 0.4 | 0.4 | 0.4 | 0.4 | 0.4 | 0.4 | 0.4 | 0.4 |
| Polymerization initiator | | HMPPO | 0.5 | 0.5 | 0.5 | 0.5 | 0.5 | 0.5 | 0.5 | 0.5 |
| Solution used in autoclaving | | | phosphate buffer containing HCO-60 | phosphate buffer containing HCO-60 | phosphate buffer containing HCO-60 | phosphate buffer containing HCO-60 | phosphate buffer | phosphate buffer | phosphate buffer | phosphate buffer |
| Results of evaluation | | Lubricity | A | A | B | B | C | B | B | B |
| | | Water wettability | A | B | B | B | B | B | C | C |

As is clear from the results shown in Table 1, the contact lenses of Example 1 and Example 2 produced using 2-MTA that is the component (A), as the monomer A component, followed by the sterilization using a liquid containing a surfactant exhibited favorable results in terms of the lubricity and water wettability. On the other hand, according to Comparative Example 1 and Comparative Example 2 in which 2-MTA that is the component (A) was not used as the monomer A component, but only 2-HEMA or DMAA that is the component other than (A) was used exhibited results of evaluation inferior to Example 1 and Example 2 irrespective of containing a surfactant in the liquid used in the sterilization. Also, Comparative Example 3 and Comparative Example 4 in which a surfactant free phosphate buffer was used in the sterilization exhibited results of inferior evaluation in terms of both the lubricity and the water wettability irrespective of employing the same formulations as Example 1 and Example 2 were employed. It is to be noted that in Comparative Example 5 and Comparative Example 6 in which 2-MTA that is the component (A) was not used as the monomer A component, but only 2-HEMA or DMAA that is the component other than (A) was used, and in which a surfactant free phosphate buffer was used in the sterilization exhibited results showing still inferior water wettability.

From the foregoing results, it was indicated that lubricity and water wettability are improved when the polymerizable compound (A) having an acryloyloxy group is used for a monomer component of the polymerizable composition, and a surfactant is contained in the liquid in the sterilization.

Example 3

A polymerizable composition was prepared that contains as shown in Table 2: 24 parts by mass of 2-MTA as the component (A), that was included as the monomer A component; 10 parts by mass of the macromonomer (8) and 25 parts by mass of TRIS as the silicone compound of the component (B); 41 parts by mass of N-VP as the compound having an amide group of the component (C); 0.1 parts by mass of AMA as the crosslinking agent of the component (D); 0.4 parts by mass of HMPPO as the polymerization initiator; and 0.02 parts by mass of PCPMA as the tinting agent. This polymerizable composition was introduced into a mold having a contact lens shape (made of polypropylene; corresponding to a contact lens having a diameter of 14.2 mm and a thickness of 0.08 mm). Then this mold was irradiated with UV light for 20 min using a high-pressure mercury lamp (2 kW) to execute photopolymerization. After completing polymerization, the product was removed from the mold to obtain a polymer having a contact lens shape. The polymer was subjected to a plasma treatment in a carbon dioxide atmosphere (RF output: 50 W, 100 Pa), and thereafter immersed in distilled water containing 0.5% by mass of HCO-60 that is a surfactant to be hydrated by allowing to be swollen until reaching to equilibrium. Thereafter, the polymer was rinsed in distilled water, and sterilized in a phosphate buffer (autoclaving) to obtain a contact lens.

Example 4

A contact lens was obtained in a similar manner to Example 3 described above except that 18 parts by mass of 2-MTA of the component (A) as the monomer A component, 15 parts by mass of the macromonomer (8) and 37 parts by mass of TRIS as the silicone compound of the component (B), and 30 parts by mass of N-VP as the compound having an amide group of the component (C) were used.

Comparative Example 7

A contact lens was obtained in a similar manner to Example 3 described above except that 35 parts by mass of MMP and 10 parts by mass of DMAA of the component other than (A) as the monomer A component, 33 parts by mass of the macromonomer (8) and 22 parts by mass of TRIS as the silicone compound of the component (B), and 0.4 parts by mass of EDMA as the crosslinking agent of the component (D) were used.

Comparative Example 8

A contact lens was obtained in a similar manner to Example 3 described above except that 47 parts by mass of MMP and 15.5 parts by mass of DMAA of the component other than (A) as the monomer A component, 22.5 parts by mass of the macromonomer (8) and 15 parts by mass of TRIS as the silicone compound of the component (B), and 0.4 parts by mass of EDMA as the crosslinking agent of the component (D) were used.

Comparative Example 9

A contact lens was obtained in a similar manner to Example 3 described above except that as a liquid used for immersion in hydration surfactant free distilled water was used.

Comparative Example 10

A contact lens was obtained in a similar manner to Example 4 described above except that as a liquid used for immersion in hydration surfactant free distilled water was used.

Comparative Example 11

A contact lens was obtained in a similar manner to Comparative Example 7 described above except that as a liquid used for immersion in hydration surfactant free distilled water was used.

Comparative Example 12

A contact lens was obtained in a similar manner to Comparative Example 8 described above except that as a liquid used for immersion in hydration surfactant free distilled water was used.

Evaluation of the contact lenses of Examples 3 to 4 and Comparative Examples 7 to 12 on lubricity and water wettability was made. Thus obtained results are shown in Table 2. The water content was determined according to the following method.

[Water content]

The obtained contact lens was maintained at 20° C. for 1 hour and a weight (W1) was measured, followed by drying in a dryer preset at 105° C. for 16 hrs, and measuring a weight (W2). The water content was determined according to the following formula:

$$\text{water content (\%)}=(W1-W2)/W1\times 100$$

TABLE 2

| | | | Example 3 | Example 4 | Comparative Example 7 | Comparative Example 8 | Comparative Example 9 | Comparative Example 10 | Comparative Example 11 | Comparative Example 12 |
|---|---|---|---|---|---|---|---|---|---|---|
| Monomer A component | Component (A) | 2-MTA | 24 | 18 | — | — | 24 | 18 | — | — |
| | Component other than (A) | MMP | — | — | 35 | 47 | — | — | 35 | 47 |
| | | DMAA | — | — | 10 | 15.5 | — | — | 10 | 15.5 |
| Component (B) | | macromonomer (8) | 10 | 15 | 33 | 22.5 | 10 | 15 | 33 | 22.5 |
| | | TRIS | 25 | 37 | 22 | 15 | 25 | 37 | 22 | 15 |
| Component (C) | | N-VP | 41 | 30 | — | — | 41 | 30 | — | — |
| Component (D) | | EDMA | — | — | 0.4 | 0.4 | — | — | 0.4 | 0.4 |
| | | AMA | 0.1 | 0.1 | — | — | 0.1 | 0.1 | — | — |
| Polymerization initiator | | HMPPO | 0.4 | 0.4 | 0.4 | 0.4 | 0.4 | 0.4 | 0.4 | 0.4 |
| Tinting agent | | PCPMA | 0.02 | 0.02 | 0.02 | 0.02 | 0.02 | 0.02 | 0.02 | 0.02 |
| Liquid used in hydration treatment | | | Distilled water containing HCO-60 | Distilled water containing HCO-60 | Distilled water containing HCO-60 | Distilled water containing HCO-60 | Distilled water | Distilled water | Distilled water | Distilled water |
| Results of evaluation | Water content (%) | | 57 | 40 | 40 | 60 | 57 | 40 | 40 | 60 |
| | lubricity | | A | A | C | B | B | B | C | C |
| | Water wettability | | A | A | C | C | B | B | C | C |

As is clear from the results shown in Table 2, the contact lenses of Example 3 and Example 4 produced using 2-MTA that is the component (A) as the monomer A component, and in which distilled water containing a surfactant was used in hydration treatment exhibited favorable results in terms of the lubricity and water wettability. On the other hand, according to Comparative Examples 7 and 8 in which MMP and DMAA that are the component other than (A) were used as the monomer A component exhibited results of evaluation inferior to Example 3 and Example 4 irrespective of use of distilled water containing a surfactant in the hydration treatment. Also, Comparative Example 9 and Comparative Example 10 in which surfactant free distilled water was used in the hydration treatment exhibited results of inferior evaluation in terms of both the lubricity and the water wettability irrespective of employing the same formulations and having the same water contents as Example 3 and Example 4 were employed. It is to be noted that in Comparative Example 11 and Comparative Example 12, a component other than (A) was used as the monomer A component, whereas surfactant free distilled water was used in the hydration treatment, thereby providing materials that were most inferior in both characteristics of the water wettability and the lubricity among test samples.

[Repeated Wash Test]

With respect to the contact lens of Example 4, a repeated wash test with a care solution for contact lenses was carried out according to a care regimen. The diameter of the lens as measured in a physiological saline solution at 20° C., and results of evaluation of the lubricity and water wettability of the lens obtained before and after 15 cycles of washing and preservation are shown in Table 3.

TABLE 3

| | Before 15 wash cycles | After 15 wash cycles |
|---|---|---|
| Diameter of lens (mm) | 14.23 | 14.23 |
| Lubricity | A | A |
| Water wettability | A | A |

As is clear from the results shown in Table 3, change in the diameter of the lens, the lubricity, and the water wettability was not found before and after washing and preservation. Therefore, it was suggested that the ophthalmic lens material in which the polymer material of the present invention was used is superior in shape stability as the surfactant is less likely to be eluted from the polymer material in the solvent used in washing and the like.

Example 5

A polymerizable composition was prepared that contains as shown in Table 4: 24 parts by mass of 2-MTA as the component (A); 5 parts by mass of the macromonomer (8) and 30 parts by mass of TRIS as the silicone compound of the component (B); 41 parts by mass of N-VP as the compound having an amide group of the component (C); 0.3 parts by mass of AMA as the crosslinking agent of the component (D); 0.6 parts by mass of TPO as the polymerization initiator; 1.0 part by mass of HMEPBT as the ultraviolet ray absorbing agent; and 0.02 parts by mass of PCPMA as the tinting agent. This polymerizable composition was introduced into a mold having a contact lens shape (made of polypropylene; corresponding to a contact lens having a diameter of 14.2 mm and a thickness of 0.08 mm). Then this mold was irradiated using a blue lamp (manufactured by PHILIPS, TL20W03) for 20 min to execute photopolymerization. After completing polymerization, the product was removed from the mold to obtain a polymer having a contact lens shape. The polymer was subjected to a plasma treatment in a carbon dioxide atmosphere (RF output: 50 W, 100 Pa), and thereafter immersed in distilled water to be hydrated by allowing to be swollen until reaching to equilibrium. Thereafter, the polymer was rinsed in distilled water, and sterilized in a phosphate buffer containing 0.05% by mass of HCO-60 that is a surfactant to obtain a contact lens.

Example 6

A polymerizable composition was prepared that contains as shown in Table 4: 25 parts by mass of 2-MTA as the component (A); 10 parts by mass of the macromonomer (8) and 25 parts by mass of TRIS as the silicone compound of the component (B); 40 parts by mass of N-VP as the compound having an amide group of the component (C); 0.3 parts by mass of AMA as the crosslinking agent of the component (D);

0.4 parts by mass of HMPPO as the polymerization initiator; and 0.02 parts by mass of PCPMA as the tinting agent. This polymerizable composition was introduced into a mold having a contact lens shape (made of polypropylene; corresponding to a contact lens having a diameter of 14.2 mm and a thickness of 0.08 mm). Then this mold was irradiated with UV light for 20 min using a high-pressure mercury lamp (2 kW) to execute photopolymerization. A contact lens was thereafter obtained in a similar manner to Example 5 described above.

Evaluation of the contact lenses of Examples 5 and 6 on the lubricity and the water wettability was made according to the aforementioned method, and the water content was measured. Also, the tensile modulus of elasticity was measured in accordance with the following method. Thus obtained results are shown in Table 4.

[Tensile Modulus of Elasticity]

The contact lens was cut into dumbbell shape having a width of pulled portion of 1.8 mm, and then a tensile test was performed using an Autograph AG-IS MS type manufactured by Shimadzu Corporation. The measurement was carried out in a physiological saline solution at 20° C., and the tensile modulus of elasticity (Young's modulus) was calculated from a stress-strain curve.

TABLE 4

| | | Example 5 | Example 6 |
|---|---|---|---|
| Component (A) | 2-MTA | 24 | 25 |
| Component (B) | Macromonomer (8) | 5 | 10 |
| | TRIS | 30 | 25 |
| Component (C) | N-VP | 41 | 40 |
| Component (D) | AMA | 0.3 | 0.3 |
| Polymerization initiator | TPO | 0.6 | — |
| | HMPPO | — | 0.4 |
| Ultraviolet ray absorbing agent | HMEPBT | 1.0 | — |
| Tinting agent | PCPMA | 0.02 | 0.02 |
| Liquid used in hydration treatment | | Distilled water | Distilled water |
| Solution used in autoclaving | | Phosphate buffer containing HCO-60 | Phosphate buffer containing HCO-60 |
| Results of evaluation | Lubricity | A | A |
| | Water wettability | A | A |
| | Water content (%) | 57 | 58 |
| | Tensile modulus of elasticity (MPa) | 0.3 | 0.4 |

As is clear from the results shown in Table 4, the contact lenses of Example 5 and Example 6 were both superior in flexibility, and also superior in the lubricity and the water wettability.

Example 7

A contact lens was obtained in a similar manner to Example 6 described above except that a physiological saline solution (0.9% aqueous NaCl solution) containing 0.05% by mass of HCO-60 that is a surfactant was used in the sterilization.

Example 8

A contact lens was obtained in a similar manner to Example 6 described above except that a physiological saline solution (0.9% aqueous NaCl solution) containing 0.05% by mass of polyoxyethylene (100) hydrogenated castor oil was used in the sterilization.

Example 9

A contact lens was obtained in a similar manner to Example 6 described above except that a physiological saline solution (0.9% aqueous NaCl solution) containing 0.05% by mass of polyoxyethylene (9) lauryl ether was used in the sterilization.

Example 10

A contact lens was obtained in a similar manner to Example 6 described above except that a physiological saline solution (0.9% aqueous NaCl solution) containing 0.05% by mass of lauric acid polyoxyethylene sorbitan (polysorbate 20) was used in the sterilization.

Comparative Example 13

A contact lens was obtained in a similar manner to Example 6 described above except that a physiological saline solution (0.9% aqueous NaCl solution) containing 0.05% by mass of polyethylene glycol (molecular weight: 1,000) was used in the sterilization.

Comparative Example 14

A contact lens was obtained in a similar manner to Example 6 described above except that a physiological saline solution (0.9% aqueous NaCl solution) containing 0.05% by mass of polyethylene glycol (molecular weight: 35,000) was used in the sterilization.

Comparative Example 15

A contact lens was obtained in a similar manner to Example 6 described above except that a physiological saline solution (0.9% aqueous NaCl solution) containing 0.05% by mass of polyvinylpyrrolidone (molecular weight: 10,000) was used in the sterilization.

Comparative Example 16

A contact lens was obtained in a similar manner to Example 6 described above except that a physiological saline solution (0.9% aqueous NaCl solution) containing 0.05% by mass of polyvinylpyrrolidone (molecular weight: 40,000) was used in the sterilization.

Comparative Example 17

A contact lens was obtained in a similar manner to Example 6 described above except that a physiological saline solution (0.9% aqueous NaCl solution) containing 0.05% by mass of polyvinyl alcohol was used in the sterilization.

Comparative Example 18

A contact lens was obtained in a similar manner to Example 6 described above except that a physiological saline solution (0.9% aqueous NaCl solution) containing 0.05% by mass of methoxy terminal polyoxyethylene (molecular weight: 350) was used in the sterilization.

Comparative Example 19

A contact lens was obtained in a similar manner to Example 6 described above except that any substance is not added to a physiological saline solution (0.9% aqueous NaCl solution) used in the sterilization.

TABLE 5

| | Component contained in physiological saline solution used in sterilization | Lubricity | Water wettability |
|---|---|---|---|
| Example 7 | polyoxyethylene (60) hydrogenated castor oil (HCO-60) | A | A |
| Example 8 | polyoxyethylene (100) hydrogenated castor oil | A | A |
| Example 9 | polyoxyethylene (9)lauryl ether | A | A |
| Example 10 | Polysorbate 20 | A | A |
| Comparative Example 13 | polyethylene glycol (molecular weight: 1,000) | C | C |
| Comparative Example 14 | polyethylene glycol (molecular weight: 35,000) | C | C |
| Comparative Example 15 | Polyvinylpyrrolidone (molecular weight: 10,000) | B | A |
| Comparative Example 16 | Polyvinylpyrrolidone (molecular weight: 40,000) | B | A |
| Comparative Example 17 | polyvinyl alcohol | C | C |
| Comparative Example 18 | methoxy terminal polyoxyethylene (molecular weight: 350) | B | B |
| Comparative Example 19 | None | C | C |

As is clear from the results shown in Table 5, Examples 7 to 10 in which a physiological saline solution containing a surfactant was used in sterilization exhibited favorable results in terms of the lubricity and water wettability. On the other hand, Comparative Examples 13 to 18 in which a physiological saline solution containing a component other than surfactants was used in sterilization exhibited inferior results of evaluation in terms of the lubricity and water wettability as compared with the aforementioned Examples. In addition, Comparative Example 19 in which a physiological saline solution to which any additive was not added was used in sterilization also failed to achieve superior effects.

Example 11

The lens prior to hydration produced in Example 5 was used to carry out hydration in purified water (10 mL) containing polyoxyethylene (20) hydrogenated castor oil that is a surfactant (0.5% by mass) at 50° C. for 10 min, and then subjected to an elution treatment by additionally immersing in purified water for 10 min at room temperature. Thereafter, a sterilization (autoclaving) was carried out in about 2 mL of phosphate buffer to obtain a contact lens.

Example 12

A contact lens was obtained in a similar manner to Example 11 except that purified water (10 mL) containing polyoxyethylene (40) hydrogenated castor oil that is a surfactant (0.5% by mass) was employed as a liquid for use in hydration.

Example 13

A contact lens was obtained in a similar manner to Example 11 except that purified water (10 mL) containing 0.5% by mass of HCO-60 that is a surfactant was employed as a liquid for use in hydration.

Example 14

A contact lens was obtained in a similar manner to Example 11 except that purified water (10 mL) containing polyoxyethylene (100) hydrogenated castor oil that is a surfactant (0.5% by mass) was employed as a liquid for use in hydration.

Example 15

A contact lens was obtained in a similar manner to Example 11 except that purified water (10 mL) containing polysorbate 80 that is a surfactant (0.5% by mass) was employed as a liquid for use in hydration.

Example 16

A contact lens was obtained in a similar manner to Example 11 except that purified water (10 mL) containing poloxamer 407 that is a surfactant (0.5% by mass) was employed as a liquid for use in hydration.

Comparative Example 20

A contact lens was obtained in a similar manner to Example 11 except that purified water (10 mL) not containing a surfactant was employed as a liquid for use in hydration.

The contact angle (sessile drop method and captive bubble method) was measured according to the following method for the evaluation of water wettability of the lens obtained in Examples 11 to 16 and Comparative Example 20. The results are shown in Table 6.

[Contact Angle]

Using Drop Master 500 manufactured by Kyowa Interface Science Co., Ltd., measurement of the contact angle using 2 μL of a physiological saline solution (sessile drop method), or measurement of the contact angle using 2 μL of bubble (captive bubble method) was carried out in an environment of a temperature of 25° C. Note that in the case of the captive bubble method, the surrounding liquid used was a physiological saline solution.

TABLE 6

| | | Contact angle (degree) | |
|---|---|---|---|
| | Aqueous solution used in hydration | Sessile drop method | Captive bubble method |
| Example 11 | polyoxyethylene (20) hydrogenated castor oil 0.5% aqueous solution | 44 | 32 |
| Example 12 | polyoxyethylene (40) hydrogenated castor oil 0.5% aqueous solution | 48 | 29 |
| Example 13 | polyoxyethylene (60) hydrogenated castor oil 0.5% aqueous solution | 49 | 30 |
| Example 14 | polyoxyethylene (100) hydrogenated castor oil 0.5% aqueous solution | 25 | 30 |
| Example 15 | polysorbate 80 0.5% aqueous solution | 30 | 31 |
| Example 16 | poloxamer 407 0.5% aqueous solution | 21 | 28 |
| Comparative Example 20 | purified water | 82 | 39 |

From the results shown in Table 6, it was indicated that Examples 11 to 16 in which an aqueous solution containing any of various surfactants was used in hydration achieved a lower contact angle as compared with the contact angle according to Comparative Example 20 in which purified water not containing anything was used in hydration achieved. These results suggest that water wettability of the polymer material of the present invention can be improved by using an aqueous solution containing a surfactant in hydration.

Example 17

The contact lens of Example 13 was stored at 45° C. for one month. The diameter of the contact lens after storing was measured to reveal to be smaller by 0.04 mm than the diameter before storing; however, it was acceptable in terms of use thereof, suggesting that the polymer material of the present invention is superior in shape stability.

Example 18

The polymerizable composition prepared in Example 5 (containing 24 parts by mass of 2-MTA as the component (A); 5 parts by mass of the macromonomer (8) and 30 parts by mass of TRIS as the silicone compound of the component (B); 41 parts by mass of N-VP as the compound having an amide group of the component (C); 0.3 parts by mass of AMA as the crosslinking agent of the component (D); 0.6 parts by mass of TPO as the polymerization initiator; 1.0 part by mass of HMEPBT as the ultraviolet ray absorbing agent; and 0.02 parts by mass of PCPMA as the tinting agent) was introduced into a mold (made of polypropylene; corresponding to a contact lens having a diameter of 14.2 mm and a thickness of 0.08 mm) having a contact lens shape. Subsequently, this mold was irradiated using a blue lamp (manufactured by PHILIPS, TL20W03) for 20 min to execute photopolymerization. After completing polymerization, the product was removed from the mold to obtain a polymer having a contact lens shape. The polymer was subjected to a plasma treatment in a carbon dioxide atmosphere (RF output: 25 W, 100 Pa), and thereafter hydration was carried out by immersing the dry lens in a 0.05% by mass aqueous polysorbate 80 surfactant solution (2 mL) at 50° C. for 10 min. The polymer was then subjected to an elution treatment by immersing in 2 mL of purified water at room temperature for 60 min. Thereafter, a sterilization (autoclaving) was carried out in about 2 mL of phosphate buffer, and evaluation of water wettability of the lens after sterilization was made by visual inspection of the appearance. In addition, the amount of incorporation of the surfactant into the lens was determined based on the amount of decrease of polysorbate 80 in the external liquid yielded after the hydration in the foregoing treatments. The results are shown in Table 7.

Example 19

A contact lens was obtained in a similar manner to Example 18 except that the concentration of the aqueous surfactant polysorbate 80 solution used for immersion in the hydration was 0.02% by mass.

Comparative Example 20

A contact lens was obtained in a similar manner to Example 18 except that the concentration of the aqueous surfactant polysorbate 80 solution used for immersion in the hydration was 0.01% by mass.

Comparative Example 21

A contact lens was obtained in a similar manner to the aforementioned Example 18 except that the liquid used for immersion in the hydration was purified water.

[Assay of Surfactant Polysorbate 80]

1) Ammonium tetrathiocyanatocobaltate (II) solution (hereinafter, referred to as "cobalt solution"): 31.0 g of ammonium thiocyanate and 14.0 g of cobalt (II) nitrate hexahydrate were weighed into a 100 mL volumetric flask, and filled to a volume of 100 mL with purified water.
2) Preparation of solution for measurement and measurement of absorbance: 1 mL of a test liquid (hydration liquid before or after immersion of the lens), 6 mL of a saturated saline solution and 200 μL of a cobalt solution were placed into a 10 mL sample bottle, the solution was mixed vigorously, and left to stand for 1 hour, followed by measurement of the absorbance at 622 nm.
3) Amount of surfactant into the lens: Concentrations of polysorbate 80 in the liquids before and after immersing the lens (W0 and W1, unit%) were determined on a calibration curve produced using polysorbate 80 solutions having a known concentration. The amount of the surfactant into the lens was determined according to the following formula (a). Furthermore, as the lens used in the test had a weight (20° C., in equilibrium swelling) of 30 mg, the content of the surfactant relative to the total weight of the contact lens was determined according to the following formula (b):

$$\text{amount of surfactant in the lens } (\mu g) = (W0 - W1)/100 \times 2 \times 10^6$$

W0: concentration of polysorbate 80 in the liquid before immersion of the lens (%)

W1: concentration of polysorbate 80 in the liquid after immersion of the lens (%) (a)

Content of the surfactant in the contact lens (%)=amount of surfactant in the lens (μg)/contact lens weight (mg)/10 (b)

TABLE 7

| | Liquid used in hydration treatment | Water wettability | Amount of surfactant in the lens (μg) | Content of surfactant in the lens (relative to lens, % by mass) |
|---|---|---|---|---|
| Example 18 | polysorbate 80 0.05% aqueous solution | A | 50 | 0.17 |
| Example 19 | polysorbate 80 0.02% aqueous solution | A | 20 | 0.07 |
| Comparative Example 20 | polysorbate 80 0.01% aqueous solution | B | 10 | 0.03 |
| Comparative Example 21 | purified water | B | — | — |

From the results shown in Table 7, Example 18 and Example 19 in which the amount of the surfactant incorporated into the contact lens relative to the total weight of the contact lens was 0.07 to 0.17% exhibited superior water wettability. To the contrary, Comparative Example 20 in which the amount of the incorporated surfactant relative to the total weight of the contact lens was 0.03%, and Comparative Example 21 in which a surfactant was not included exhibited inferior water wettability as compared to Examples 18 and 19 described above.

Production Example 1

A polymerizable composition was prepared that contains as shown in Table 8: 20 parts by mass of 2-MTA as the component (A) that was included as the monomer A component; 30 parts by mass of the macromonomer (8) and 30 parts by mass of TRIS as the silicone compound of the component (B); 20 parts by mass of N-VP as the component (C); 0.4 parts by mass of EDMA as the crosslinking agent of the component (D); and 0.4 parts by mass of HMPPO as the polymerization initiator. This polymerizable composition was introduced into a mold having a contact lens shape (made of polypropylene; corresponding to a contact lens having a diameter of 14.2 mm and a thickness of 0.08 mm). Then this mold was irradiated with UV light for 20 min using a high-pressure mercury lamp (2 kW) to execute photopolymerization. After completing polymerization, the product was removed from the mold to obtain a polymer.

Production Example 2

A polymer having a contact lens shape was obtained in a similar manner to the aforementioned Production Example 1 except that 2-ETA that is the component (A) in an amount of 20 parts by mass was used as the monomer A component.

Production Example 3

A polymer having a contact lens shape was obtained in a similar manner to the aforementioned Production Example 1 except that EEA that is the component (A) in an amount of 20 parts by mass was used as the monomer A component.

Production Example 4

A polymer having, a contact lens shape was obtained in a similar manner to the aforementioned Production Example 1 except that EA that is the component (A) in an amount of 20 parts by mass was used as the monomer A component.

Production Example 5

A polymer having a contact lens shape was obtained in a similar manner to the aforementioned Production Example 1 except that BuA that is the component (A) in an amount of 20 parts by mass was used as the monomer A component.

Production Example 6

A polymer having a contact lens shape was obtained in a similar manner to the aforementioned Production Example 1 except that: 2-MTA that is the component (A) in an amount of 25 parts by mass as the monomer A component; 10 parts by mass of the macromonomer (8) and 25 parts by mass of TRIS as the silicone compound of the component (B); 40 parts by mass of N-VP as the component (C); 0.4 parts by mass of EDMA as the crosslinking agent of the component (D); and 0.4 parts by mass of HMPPO as the polymerization initiator (composition β in Table 8) were used.

Production Example 7

A polymer having a contact lens shape was obtained in a similar manner to the aforementioned Production Example 6 except that 2-ETA that is the component (A) in an amount of 25 parts by mass was used as the monomer A component.

Production Example 8

A polymer having a contact lens shape was obtained in a similar manner to the aforementioned Production Example 6 except that EEA that is the component (A) in an amount of 25 parts by mass was used as the monomer A component.

Production Example 9

A polymer having a contact lens shape was obtained in a similar manner to the aforementioned Production Example 6 except that EA that is the component (A) in an amount of 25 parts by mass was used as the monomer A component.

Production Example 10

A polymer having a contact lens shape was obtained in a similar manner to the aforementioned Production Example 6 except that BuA that is the component (A) in an amount of 25 parts by mass was used as the monomer A component.

Comparative Production Example 1

A polymer having a contact lens shape was obtained in a similar manner to the aforementioned Production Example 1 except that 2-HEMA that is the component other than (A) in an amount of 20 parts by mass was used as the monomer A component.

Comparative Production Example 2

A polymer having a contact lens shape was obtained in a similar manner to the aforementioned Production Example 1 except that DMAA that is the component other than (A) in an amount of 20 parts by mass was used as the monomer A component.

Comparative Production Example 3

A polymer having a contact lens shape was obtained in a similar manner to the aforementioned Production Example 1 except that MMP that is the component other than (A) in an amount of 20 parts by mass was used as the monomer A component.

Comparative Production Example 4

A polymer having a contact lens shape was obtained in a similar manner to the aforementioned Production Example 1 except that EMA that is the component other than (A) in an amount of 20 parts by mass was used as the monomer A component.

Comparative Production Example 5

A polymer having a contact lens shape was obtained in a similar manner to the aforementioned Production Example 1 except that BuMA that is the component other than (A) in an amount of 20 parts by mass was used as the monomer A component.

Comparative Production Example 6

A polymer having a contact lens shape was obtained in a similar manner to the aforementioned Production Example 6 except that 2-HEMA that is the component other than (A) in an amount of 25 parts by mass was used as the monomer A component.

Comparative Production Example 7

A polymer having a contact lens shape was obtained in a similar manner to the aforementioned Production Example 6 except that DMAA that is the component other than (A) in an amount of 25 parts by mass was used as the monomer A component.

Comparative Production Example 8

A polymer having a contact lens shape was obtained in a similar manner to the aforementioned Production Example 6 except that MMP that is the component other than (A) in an amount of 25 parts by mass was used as the monomer A component.

Comparative Production Example 9

A polymer having a contact lens shape was obtained in a similar manner to the aforementioned Production Example 6 except that EMA that is the component other than (A) in an amount of 25 parts by mass was used as the monomer A component.

Comparative Production Example 10

A polymer having a contact lens shape was obtained in a similar manner to the aforementioned Production Example 6 except that BuMA that is the component other than (A) in an amount of 25 parts by mass was used as the monomer A component.

TABLE 8

| Component | | Amount blended (parts by mass) | |
|---|---|---|---|
| | | Composition α | Composition β |
| Monomer A component | | 20 | 25 |
| Component (B) | macromonomer (8) | 30 | 10 |
| | TRIS | 30 | 25 |
| Component (C) | N-VP | 20 | 40 |
| Component (D) | EDMA | 0.4 | 0.4 |
| polymerization initiator | HMPPO | 0.4 | 0.4 |

Also, in connection with the homopolymer of the monomer A component used, values of the glass transition temperature (Tg) and the percentage of water absorption are shown in Table 9. The glass transition temperature of the homopolymer of the monomer A component is a measurement obtained by differential scanning calorimetry (DSC)at a scan speed of 20° C./min, or a value cited from a document (Polymer Handbook, 3rd Ed.). Moreover, the percentage of water absorption of the homopolymer of the monomer A component is a value derived by: measuring the mass W1 (g) of the homopolymer immersed in distilled water at 25° C. for at least 16 hrs, and the mass W2 (g) of the homopolymer thereafter dried in an oven preset at 105° C. for 16 hrs, respectively; and calculating according to the following formula. It is to be noted that the homopolymer of the monomer A component was obtained by curing according to the aforementioned method a mixture prepared by adding 0.4 parts by mass of EDMA that is a crosslinking agent and 0.4 parts by mass HMPPO that is a polymerization initiator to 100 parts by mass of the monomer A component.

$$\text{Percentage of water absorption (\%)}=(W1-W2)/W1\times 100$$

TABLE 9

| Monomer A component | | Glass transition temperature of homopolymer (° C.) | Percentage of water absorption of homopolymer (%) |
|---|---|---|---|
| Component (A) | 2-MTA | −50 | 5.1 |
| | 2-ETA | −50 | 5.0 |
| | EEA | −70 | 5.5 |
| | EA | −24 | 1.4 |
| | BuA | −59 | 1.6 |
| Component other than (A) | EMA | 65 | 1.6 |
| | BuMA | 20 | 1.4 |
| | 2-HEMA | 55 | 8.4 |
| | DMAA | 89 | 90.3 |
| | MMP | 50 | 83.7 |

The monomer residual percentage of the polymers having a contact lens shape obtained in Production Examples 1 to 10 and Comparative Production Examples 1 to 10 was determined according to the following method. The results obtained are shown in Table 10.

[Assay of Residual Monomer Component]

<Assay of Residual N-VP>

The polymers having a contact lens shape obtained in Production Examples 1 to 10 and Comparative Production Examples 1 to 10 were immersed in acetonitrile to extract the residual component. This extraction liquid was analyzed on HPLC, and the monomer residual percentage (%) was calculated on the N-VP component as the residual component (C). Upon assay of the residual percentage, an acetonitrile solution of N-VP having a known concentration was prepared and subjected to an HPLC analysis, and a calibration curve was produced from the results of the analysis, with the N-VP concentration (ppm) presented along the x axis, and with the peak area of the HPLC analysis presented along the y axis. The residual percentage S1 (%) of N-VP in the polymerizable composition relative to the amount blended, and the mass proportion S2 (%) of the residual monomer relative to the polymer having a contact lens shape were calculated as in the following to determine to the order of 0.1%. Note that: V represents the amount of extraction solvent (mL); A represents the peak area of N-VP; "a" represents the slope of the calibration curve; "b" represents the intercept of the calibration curve; W represents the mass of the polymer material (g); and "w" represents the mass fraction (%) of N-VP blended in the polymerizable composition.

$$S1(\%)=\{V\times(A-b)\}/(a\times W\times w\times 100)$$

$$S2(\%)=\{V\times(A-b)\}/(a\times W\times 10{,}000)$$

<Assay of Residual TRIS>

With regard to Production Examples 1 to 10 and Comparative Production Examples 1 to 10, the obtained polymer materials having a contact lens shape were subjected to measurement of the residual percentage of the monomer, i.e., TRIS that is the component (B) relative to the amount blended. The measurement was conducted by a similar method to N-VP described above, and similarly to S1 (%) and S2 (%) in the case of N-VP described above, the residual percentage S3 (%) of TRIS in the polymerizable composition relative to the amount blended, and the mass proportion S4 (%) of the residual monomer relative to the polymer material having a contact lens shape were calculated to the order of 0.01%.

TABLE 10

| | Composition | Monomer A component | | Residual percentage (*1) N-VP S1 (%) | N-VP S2 (%) | TRIS S3 (%) | TRIS S4 (%) |
|---|---|---|---|---|---|---|---|
| Production Example 1 | Composition α | Component (A) | 2-MTA | 0.1 | less than 0.1 | less than 0.01 | less than 0.01 |
| Production Example 2 | | | 2-ETA | 0.1 | less than 0.1 | less than 0.01 | less than 0.01 |
| Production Example 3 | | | EEA | 0.1 | less than 0.1 | less than 0.01 | less than 0.01 |
| Production Example 4 | | | EA | 0.1 | less than 0.1 | 0.03 | 0.01 |
| Production Example 5 | | | BuA | 0.2 | less than 0.1 | 0.03 | 0.01 |
| Production Example 6 | Composition β | | 2-MTA | 0.6 | 0.3 | less than 0.01 | less than 0.01 |
| Production Example 7 | | | 2-ETA | 0.6 | 0.3 | less than 0.01 | less than 0.01 |
| Production Example 8 | | | EEA | 0.8 | 0.3 | less than 0.01 | less than 0.01 |
| Production Example 9 | | | EA | 1.9 | 0.8 | 0.04 | 0.01 |
| Production Example 10 | | | BuA | 1.7 | 0.7 | 0.04 | 0.01 |
| Comparative Production Example 1 | Composition α | Component other than (A) | 2-HEMA | 3.9 | 0.8 | 0.14 | 0.04 |
| Comparative Production Example 2 | | | DMAA | 1.2 | 0.2 | 0.03 | less than 0.01 |
| Comparative Production Example 3 | | | MMP | 6.7 | 1.3 | 0.02 | less than 0.01 |
| Comparative Production Example 4 | | | EMA | 23.8 | 4.7 | 19.70 | 5.91 |
| Comparative Production Example 5 | | | BuMA | 23.4 | 4.6 | 7.75 | 2.33 |
| Comparative Production Example 6 | Composition β | | 2-HEMA | 4.8 | 1.9 | less than 0.01 | less than 0.01 |
| Comparative Production Example 7 | | | DMAA | 4.3 | 1.7 | less than 0.01 | less than 0.01 |
| Comparative Production Example 8 | | | MMP | 10.5 | 4.2 | 0.03 | less than 0.01 |
| Comparative Production Example 9 | | | EMA | 19.4 | 7.7 | 22.28 | 5.57 |
| Comparative Production Example 10 | | | BuMA | 16.8 | 6.7 | 9.82 | 2.46 |

(*1) When N-VP was not detected as a peak, or when the calculated values S1 and S2 were less than 0.1%, the denotation was made as "less than 0.1%". Also, in the case of TRIS, since it is a water insoluble compound, S3 and S4 were both determined to the level of 0.01%, and provided that TRIS was not detected as a peak, or when the calculated values S3 and S4 were less than 0.01%, the denotation was made as "less than 0.01%".

As is clear from the results shown in Table 10, Production Examples 1 to 10 indicated that the residual percentage of N-VP was significantly reduced as compared with Comparative Production Examples 1 to 10, irrespective of the amount of N-VP blended in the polymerizable composition. Also, it was indicated that Production Examples 1 to 10 achieved extremely minimized residual percentage of the water insoluble TRIS as compared with Comparative Production Examples 1, 4, 5, 9 and 10.

Example 20

A contact lens was obtained in a similar manner to Example 6 except that 0.5 parts by mass of l-menthol that is a refrigerant was added as an additive of the component (E) to the polymerizable composition prepared in Example 6. However, a phosphate buffer not containing a surfactant was used in the sterilization.

Example 21

A contact lens was obtained in a similar manner to the aforementioned Example 20 except that 1.0 parts by mass of l-menthol that is a water soluble organic solvent was added to the polymerizable composition as an additive of the component (E).

Example 22

A contact lens was obtained in a similar manner to the aforementioned Example 20 except that 0.5 parts by mass of HCO-60 that is a surfactant was added to the polymerizable composition.

Example 23

A contact lens was obtained in a similar manner to the aforementioned Example 20 except that 1.0 part by mass of HCO-60 that is a surfactant was added to the polymerizable composition.

In Examples 6, and 20 to 23, the polymer material having a contact lens shape obtained by removing from the mold after curing was subjected to an extraction treatment similarly to the aforementioned method by immersing in acetonitrile, whereby the residual percentages (S1 and S2) of the residual N-VP monomer were determined. In addition, with regard to the contact lens obtained by subjecting the polymer material to each treatment of the surface treatment, hydration, elution, sterilization in sequence, the lubricity and the water wettability were evaluated similarly to the method described above. The results obtained are shown-in Table 11.

TABLE 11

| | Addition to polymerizable composition | Solution used in autoclaving | N-VP residual percentage (%) S1 | S2 | lubricity | water wettability |
|---|---|---|---|---|---|---|
| Example 6 | None | phosphate buffer containing 0.05% of HCO-60 | 1.0 | 0.4 | A | A |
| Example 20 | l-menthol 0.5% | phosphate buffer | 0.6 | 0.3 | A | A |
| Example 21 | l-menthol 1.0% | phosphate buffer | 0.4 | 0.2 | A | A |

TABLE 11-continued

| | Addition to polymerizable composition | Solution used in autoclaving | N-VP residual percentage (%) S1 | S2 | lubricity | water wettability |
|---|---|---|---|---|---|---|
| Example 22 | HCO-60 0.5% | phosphate buffer | 0.7 | 0.3 | A | A |
| Example 23 | HCO-60 1.0% | phosphate buffer | 0.4 | 0.2 | A | A |

As is clear from the results shown in Table 11, it was indicated that the residual N-VP of the polymer material was further reduced by using the additive of the component (E). Further, it was also suggested that when a surfactant was used in place of the additive of the component (E), the residual N-VP of the polymer material was further reduced. Additionally, also when an additive of the component (E) was used, or when a surfactant was used in place of the component (E), favorable lubricity and water wettability were exhibited similarly to the case in which a surfactant was employed in the sterilization, also suggesting that the polymer had a surface that is suitable as a material for ophthalmic lenses.

Example 24

The content of l-menthol in the contact lens produced in Example 20 was determined by performing a GC analysis of the extraction liquid with methanol. The content of l-menthol after sterilization in a physiological saline solution accounted for 11% of the theoretical value. From this result, it is envisaged that a large amount of l-menthol eluted in the production process of the lens. However, even after storage for the following six months in the same liquid at room temperature, the content of l-menthol in the lens was 8% of the theoretical value, suggesting the absence of significant variation.

Example 25

A contact lens was produced in a similar manner to Example 20 except that sterilization was carried out in a physiological saline solution containing 0.05% of HCO-6.0 that is a surfactant in Example 20. As a result of assay of the content of l-menthol in a similar manner, the content was 14% of the theoretical value immediately after the sterilization, and was 8% of the theoretical value after storage for six months at room temperature. Accordingly, it is believed that the surfactant in the stock solution does not affect elution properties of l-menthol.

Industrial Applicability

Since the polymer material of the present invention is superior in water wettability and surface wettability, and also enables superior stability to be provided irrespective of containing a surfactant, it can be suitably used in ophthalmic lenses such as contact lenses, as well as intraocular lenses, artificial cornea, corneal onlay, corneal inlay and the like. Moreover, in addition to ophthalmic lenses, it can be used in various applications such as catheters, tubes, stents, pipings, blood bags, probes, thin films, and the like.

What is claimed is:

1. An ophthamalic lens comprising a polymer material having a water content of no less than 40%, the polymer material comprising:

[I] a polymer having a constitutional unit derived from (A) a polymerizable compound having an acryloyloxy group and not having a silicon atom, and a constitutional unit derived from (B) a silicone compound having a polymerizable group; and

[II] a surfactant that is retained within the polymer material by interacting with the acryloyloxy group of the constitutional unit derived from (A), wherein the silicone compound (B) comprises (B') an ethylenic unsaturated group as the polymerizable group, a urethane bond, and at least one group having a structure represented by the formula (5):

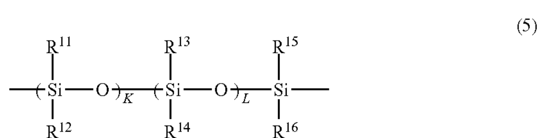

(5)

wherein $R^{11}$, $R^{12}$, $R^{13}$, $R^{14}$, $R^{15}$ and $R^{16}$ each independently represent an alkyl group having 1 to 6 carbon atoms, a fluorine-substituted alkyl group having 1 to 6 carbon atoms, a phenyl group or hydrogen atom; K is an integer of 10 to 100; L is 0 or an integer of 1 to 90; and the sum of K and L is an integer of 10 to 100.

2. The ophthamalic lens according to claim 1, wherein the content of the surfactant [II] is 0.05% by mass or greater and 1% by mass or less.

3. The ophthamalic lens according to claim 1, wherein the surfactant [II] is a nonionic surfactant having a polyoxyethylene group.

4. The ophthamalic lens according to claim 3, wherein the nonionic surfactant having a polyoxyethylene group is at least one selected from the group consisting of polyoxyethylene hydrogenated castor oils, polyoxyethylene sorbitan fatty acid esters, polyoxyethylene polyoxypropylene copolymers and polyoxyethylene polysiloxane ether block copolymers.

5. The ophthamalic lens according to claim 1, wherein the glass transition temperature of a homopolymer formed from the polymerizable compound (A) is no greater than 10° C.

6. The ophthamalic lens according to claim 1, wherein the percentage of water absorption of a homopolymer formed from the polymerizable compound (A) is no greater than 20%.

7. The ophthamalic lens according to claim 1, wherein the polymerizable compound (A) is a compound represented by the following formula (1):

$$CH_2{=}CH{-}CO{-}(OCH_2CH_2)_n{-}OR^1 \quad (1),$$

wherein $R^1$ represents a methyl group or an ethyle group; and n represents an integer of from 1 to 3.

8. The ophthamalic lens according to claim 7, wherein the polymerizable compound (A) is at least one selected from the group consisting of 2-methoxyethyl acrylate, 2-ethoxyethyl acrylate, 2-methoxyethoxyethyl acrylate and 2-ethoxyethoxyethyl acrylate.

9. The ophthamalic lens according to claim 1, wherein (B') comprises (B1) a group having an ethylenic unsaturated double bond and a group having a polydimethylsiloxane structure via a urethane bond.

10. The ophthamalic lens according to claim 1, wherein the polymer [I] has a constitutional unit derived from (C) a compound having an amide group.

11. The ophthamalic lens according to claim 10, wherein the compound having an amide group (C) is N-vinylpyrrolidinone (C').

12. The ophthamalic lens according to claim 11, wherein the polymer [I] is formed from a polymerizable composition containing the polymerizable compound (A), the silicone compound (B) and N-vinylpyrrolidinone (C') and wherein the content of the polymerizable compound (A) is 10 parts by mass or greater and 45 parts by mass or less, the content of the silicone compound (B) is 10 parts by mass or greater and 70 parts by mass or less, and the content of N-vinylpyrrolidinone (C') is 10 parts by mass or greater and 50 parts by mass or less, relative to 100 parts by mass of the total amount of the polymerizable compound (A), the silicone compound (B) and N-vinylpyrrolidinone (C').

13. The ophthamalic lens according to claim 12, wherein the polymerizable composition further contains a nonpolymerizable additive selected from the group consisting of a water soluble organic solvent, a refrigerant and a thickener; and the content of the additive is 5 parts by mass or less relative to 100 parts by mass of the total amount of the polymerizable compound (A), the silicone compound (B) and the N-vinylpyrrolidinone (C').

14. The ophthamalic lens according to claim 13, wherein the polymerizable composition contains at least one water soluble organic solvent selected from the group consisting of an alcohol having 1 to 3 carbon atoms, acetone, methyl ethyl ketone, dimethylformamide, dimethyl sulfoxide, acetonitrile, -methyl-2-pyrrolidone and dimethoxyethane.

15. The ophthamalic lens according to claim 13, wherein the polymerizable composition contains at least one refrigerant selected from the group consisting of l-menthol, d-menthol, dl-menthol, d-camphor, dl-camphor, d-borneol, dl-borneol, geraniol, eucalyptus oil, bergamot oil, fennel oil, peppermint oil, rose oil and cool mint.

16. The ophthamalic lens according to claim 13, wherein the polymerizable composition contains at least one thickener selected from the group consisting of sodium hyaluronate, sodium chondroitin sulfate, sodium alginate, sorbitol, dextran 70, sodium carboxymethyl cellulose, hydroxyethyl cellulose, hydroxypropylmethyl cellulose, carboxyvinyl polymer, polyvinyl alcohol, polyvinylpyrrolidone and macrogol 4000.

17. The ophthamalic lens according to claim 1, wherein the ophthamalic lens is a contact lens.

18. An ophthamalic lens comprising a polymer material having a water content of no less than 40%, the polymer material comprising:

[I] a polymer having a constitutional unit derived from (A) a polymerizable compound having an acryloyloxy group and not having a silicon atom, and a constitutional unit derived from (B1) a silicone compound having a polymerizable group and represented by the following formula (2); and

[II] a surfactant, $$A^1\text{-}U^1\text{—}(S^1\text{-}W)_m\text{—}S^2\text{—}U^2\text{-}A^2 \quad (2),$$

wherein $A^1$ and $A^2$ are each independently a group represented by the following formula (3); $U^1$ and $U^2$ are each independently a group represented by the following formula (4); $S^1$ and $S^2$ are each independently a group represented by the following formula (5); W is a group represented by the following formula (6); and m represents an integer of 0 to 10;

$$Y\text{—}Z\text{—}R^2\text{—} \quad (3),$$

wherein Y is a (meth)acryloyl group, a vinyl group or an allyl group; Z is an oxygen atom or a direct bond; and $R^2$ is a direct bond, or an alkylene group having 1 to 12 carbon atoms having a linear chain, branched chain or an aromatic ring, and Y in $A^1$ and $A^2$ may be the same or different;

$$\text{—}X^1\text{-}E^1\text{—}X^2\text{—}R^3\text{—} \quad (4),$$

wherein:

$X^1$ and $X^2$ are each independently selected from a direct bond, an oxygen atom and an alkylene glycol group;

$E^1$ is a —NHCO—group, a —CONH— group, or a bivalent group derived from diisocyanate selected from the group consisting of saturated or unsaturated aliphatic based-, alicyclic based- and aromatic based-diisocyanate, wherein:

when $E^1$ is a —NHCO-group, $X^1$ is a direct bond; $X^2$ is an oxygen atom or an alkylene glycol group; and $E^1$ forms an urethane bond with $X^2$;

when $E^1$ is a —CONH— group, $X^1$ is an oxygen atom or an alkylene glycol group; $X^2$ is a direct bond; and $E^1$ forms an urethane bond with $X^1$; and when $E^1$ is a bivalent group derived from diisocyanate selected from the group consisting of saturated or unsaturated aliphatic based-, alicycle based- and aromatic based-diisocyanate, $X^1$ and $X^2$ are each independently selected from an oxygen atom and an alkylene glycol group, and $E^1$ forms two urethane bonds with $X^1$ and/or $X^2$; and $R^3$ is an alkylene group having a linear or branched chain having 1 to 6 carbon atoms;

(5)

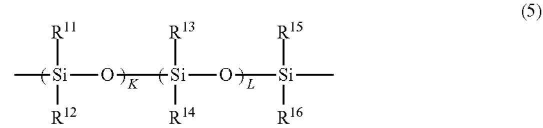

wherein $R^{11}$, $R^{12}$, $R^{13}$, $R^{14}$, $R^{15}$ and $R^{16}$ each independently represent an alkyl group having 1 to 6 carbon atoms, a fluorine-substituted alkyl group, a phenyl group or hydrogen atom; K is an integer of 10 to 100; L is 0 or an integer of 1 to 90; and the sum of K and L is an integer of 10 to 100;

$$\text{—}R^4\text{—}X^3\text{-}E^2\text{—}X^4\text{—}R^5\text{—} \quad (6),$$

wherein $R^4$ and $R^5$ are each independently an alkylene group having a linear or branched chain having 1 to 6 carbon atoms; $X^3$ and $X^4$ each independently represent an oxygen atom or an alkylene glycol group; $E^2$ is a bivalent group derived from diisocyanate selected from the group consisting of saturated or unsaturated aliphatic based-, alicyclic based-and aromatic based-diisocyanate, and $E^2$ forms two urethane bonds with $X^3$ and/or $X^4$.

19. The ophthamalic lens according to claim 1, wherein the silicone compound (B) further comprises (B2) at least one selected from a silicone-containing alkyl (meth)acrylate, a silicone-containing styrene derivative and a silicone-containing fumaric acid diester.

20. The ophthamalic lens according to claim 1, wherein the silicone compound (B) has four urethane bonds.

21. The ophthamalic lens according to claim 1, wherein the polymer [I] is formed from a polymerizable composition not having an organic solvent.

* * * * *